United States Patent [19]
Madany et al.

[11] Patent Number: 5,774,715
[45] Date of Patent: Jun. 30, 1998

[54] FILE SYSTEM LEVEL COMPRESSION USING HOLES

[75] Inventors: Peter W. Madany, Fremont; Thomas K. Wong, Pleasanton; Michael N. Nelson, San Carlos, all of Calif.

[73] Assignee: Sun Microsystems, Inc., Palo Alto, Calif.

[21] Appl. No.: 623,907

[22] Filed: Mar. 27, 1996

[51] Int. Cl.⁶ ........................................................ G06F 17/30
[52] U.S. Cl. .......................... 395/612; 395/611; 395/440; 364/715.02
[58] Field of Search ................................... 395/611, 612, 395/440; 364/715.02

[56] References Cited

U.S. PATENT DOCUMENTS

| | | | |
|---|---|---|---|
| 5,155,484 | 10/1992 | Chambers, IV | 341/55 |
| 5,237,675 | 8/1993 | Hannon, Jr. | 394/440 |
| 5,481,701 | 1/1996 | Chambers, IV | 395/612 |
| 5,551,020 | 8/1996 | Flax et al. | 395/612 |
| 5,652,857 | 7/1997 | Shimoi et al. | 395/440 |

OTHER PUBLICATIONS

Michael Burrows, et al., On–Line Data Compression in a Log–structured File System, 1992, DEC Systems Research Center, pp. 2–9.

*Primary Examiner*—Paul R. Lintz
*Attorney, Agent, or Firm*—Hickman Beyer & Weaver

[57] ABSTRACT

A method, apparatus, and computer-usable medium for compressing data in a file system utilizing the concept of "holes". A mapping table in a file system maps the logical blocks of a file to actual physical blocks on disk where the data is stored. Blocks may be arranged in units of a cluster, and the file may be compressed cluster-by-cluster. Holes are used within a cluster to indicate not only that a cluster has been compressed, but also the compression algorithm used. Different clusters within a file may be compressed with different compression algorithms. A unit of data is compressed, with the result that the file occupies fewer physical blocks than it has logical blocks. The mapping table is updated to indicate that for a given unit of data compressed, fewer physical blocks are needed. Certain logical blocks belonging to this unit of data are not mapped to physical blocks but are mapped to a hole. A hole indicates that the unit of data was compressed, and may also indicate the particular compression algorithm used to compress the unit of data. If a unit of data begins or ends within the middle of a cluster, to avoid overwriting the data not to be changed the whole cluster must first be read from disk. If a hole indicates the cluster had been compressed, the data must be expanded first. The cluster is read into a buffer and the portion to be changed is overwritten. The cluster is compressed and written back to disk. Those clusters within which the unit of data neither begins nor ends may be written to directly.

28 Claims, 14 Drawing Sheets

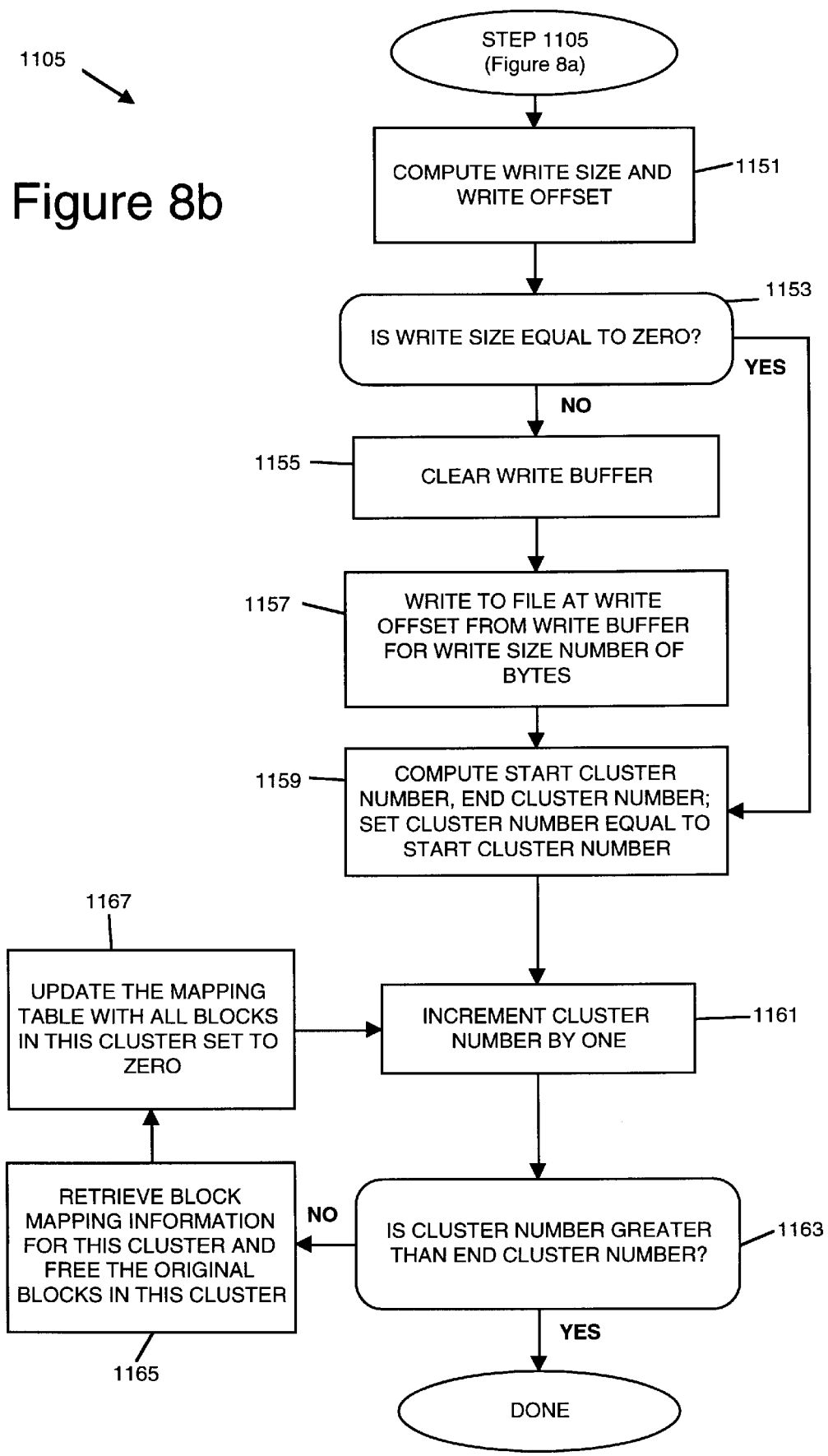

FILE SYSTEM LEVEL COMPRESSION USING HOLES

FIELD OF THE INVENTION

The present invention relates to the field of data compression in a computing system. More specifically, the present invention relates to on-line data compression at the file system level utilizing the concept of files with "holes."

BACKGROUND OF THE INVENTION

Many computer users need more on-line data storage space than is available on their computers' disk drives. The simplest solution to this problem is to purchase and install additional disk drives. However, this solution is both costly and inconvenient. To reduce their data storage needs, users must reduce the redundancy in the representation of their data, i.e. compress or compact the data. Storing data in a compressed format implies that there will be two formats for the same data: one is the preferred format for manipulation of the data, and the other is a more economical format for storing the data. Data compression thus involves two processes: a process to compress the data when it is written to a storage medium, and a process to expand (sometimes called "decompress" or "uncompress") the data when it is read from the storage medium.

The compression and expansion processes may be done in software, firmware or hardware. The data compression, if done in software, increases the software complexity of the system. It also directly increases the processing load of the system because of the additional processor cycles needed for compression and expansion. However, with the availability of ever increasingly powerful processors, it is becoming more economical to compress data in software in general, and in particular as part of the file system services provided by a computer operating system.

File system services are responsible for managing the space of storage media. They provide a logical framework to the users of a computer system for accessing data stored in the storage media. The logical framework usually includes a hierarchy of directory structures to locate a collection of files that contain user-named programs or data. The use of directories and files removes the concern from the users of finding the actual physical locations of the stored information in a storage medium. Many different types of file systems are known. In particular, popular file systems are various UNIX file systems and the WINDOWS NT file system. The UNIX file system is described in "The Design and Implementation of the 4.3BSD UNIX Operating System", S. Leffler, M. McKusick, M. Karels and J. Quarterman, chapter 7, Addison-Wesley, 1989. The WINDOWS NT file system is described in "Inside the Windows NT File System", H. Custer, Microsoft Press, 1994.

Data compression software may be implemented either at the sector level or at the file system level. Sector level compression schemes compress a disk's entire contents, including file system meta-data. They work between a file system and the disk driver, compressing data as they are written to the disk and automatically expanding the data when reading from the disk. Examples of products based upon both file and sector level compression are "Stacker" available from Stac Electronics, and "DoubleSpace" and "DriveSpace" available from Microsoft Corporation. The book "PC Intern System Programming", Michael Tischer, Abacus/Data Becker, 5th edition, 1995 also describes the "DoubleSpace" product.

The advantage of sector level compression software is that it is independent of the file system that the users use. The disadvantage is that existing user data must first be backed up to another storage device and then be restored into the storage device where the compressed data will be stored. This backing up and restoring of existing data is a time consuming and error-prone process.

File system level compression compresses files on a per file basis. It may be done in a user-transparent way as part of the basic file system services. The file system detects whether a file should be compressed, and then invokes the compression process when the file is written and the expansion process when the file is read. File system level compression may also be applied to all files or it may be explicitly initiated by the users on a per file, per directory, or per file type basis. The paper "On-line Data Compression in a Log-structured File System" by M. Burrows, C. Jerian, B. Lampson and T. Mann, Proceedings of the 5th International Conference on Architectural Support for Programming Languages and Operating Systems, 1992, describes file system level compression in general.

A typical file system implementation, hereafter referred to as a file system, converts from the user abstraction of a file as an array of bytes to the structure imposed by the underlying physical medium. Typically, magnetic disks are organized into fixed size sectors. Although the user may wish to write a single byte to a file, the disk can read or write only in multiples of sectors. Thus, in order to modify a single byte in a file, the file system must first read in the sector containing the byte to be modified, then replace the affected byte, and finally write the sector back to the disk. This operation of converting a user's random access to an array of bytes into reads and writes of disk sectors is known as "block I/O" (block input/output).

To effectively support block I/O, a file system typically divides the array of bytes in a given file into a set of fixed size logical blocks. For example, if a file system's logical block size is 8192 bytes, then logical block 0 would contain bytes 0 to 8191 of the file, and logical block 1 would contain bytes 8192 to 16383 of the file, etc.

The data in each logical block is stored in a physical block on the disk. A physical block is the location on the disk to which the file system maps a logical block. A physical block is built from one or more contiguous sectors. For a disk with 512 byte sectors, an 8192 byte logical block would be represented on disk by a 8192 byte physical block that would contain 16 contiguous sectors.

Thus, a file having N logical blocks will have a table containing N logical to physical block mappings. The first element in the mapping table for a file contains the physical block address for logical block 0, the next element contains the physical block address for logical block 1, etc.

While most applications write data to a file sequentially, some applications write data randomly to any offset in the file. For example, an application may create a new file and then write several bytes starting at offset M within the file. In this case, bytes between offset 0 and offset M−1 of the file will have never been written, but they are logically part of the file and are generally treated as if they all have the values 0.

Since it is wasteful to store a physical block for a corresponding logical block that has never been written (i.e. full of zeros), one common technique employed by some file systems is to avoid the actual allocation for such blocks. The file system designates a special physical block address, usually 0, that represents the address of a special, but non-existent, physical block that is full of zeroes. This special physical block is called a "hole."

In the above example, the file system will map the logical blocks in the range of bytes from 0 to M-1, with the exception of the logical block containing offset M, to the special physical block address to indicate that these blocks have not been allocated. A file that contains at least one hole is called a "holey" file.

Essentially, a "holey" file may be viewed as a file that has been compressed with a basic compression algorithm that only compresses away physical blocks full of zeroes. Hence, the compression is extremely limited. Also, access to a "holey" file is completely transparent to the users. Thus, it can be said that file systems that support "holey" files support a very restricted form of file system level compression. "Holey" files are supported by many commercial implementations of the UNIX operating system, such as the SunSoft Solaris operating system. Although most UNIX operating systems support "holey" files, they do not support a more general form of file level compression.

To support compression transparently at the file system level, a file system must maintain the following compression attributes: (1) whether a file is compressed or not, (2a) if a file is compressed as one unit, the storage length of the compressed file, or (2b) if a file is divided into unit s of equal length and compression is done on each unit, the storage length of each compression unit.

Most existing file systems have not been designed with this type of support for file compression. Thus, their on-disk file system formats usually do not contain the space for storing compression attributes. Typically, if an existing file system is to be enhanced to support compression, the on-disk file system format must also be changed. Changing the on-disk file system format of a file system usually require converting existing user data from the old on-disk file system format to the new format, which is a time consuming, costly, and error-prone process.

Thus, it would be desirable to extend file system level compression to existing file systems without requiring the conversion of existing data. It would also be desirable for both compressed and expanded files to coexist, thus allowing compression to be introduced gradually. It would also be desirable to be able to use multiple compression algorithms in such a file system.

SUMMARY OF THE INVENTION

An embodiment of the present invention relates to a method and apparatus for compressing data in a file system utilizing the concept of "holes". A mapping table in the file system maps the logical blocks of a file to the actual physical blocks on disk where the data is stored. A file not compressed occupies the same number of physical blocks on disk as the number of logical blocks. Blocks are typically arranged in units of a cluster, and the file may be compressed cluster-by-cluster. In some embodiments, the holes are used to indicate not only that a cluster has been compressed, but also to identify the compression algorithm used to compress that cluster. With this arrangement, different clusters within a file may be compressed using different compression algorithms. Once it is requested that a file be written to memory, a unit of data is compressed, with the result that the file will occupy fewer physical blocks than it has logical blocks. The file may then be written to memory, and the mapping table updated.

The mapping table is updated to indicate that for a given unit of data compressed, fewer physical blocks are needed. Thus, certain logical blocks belonging to this unit of data are not mapped to physical blocks but may be mapped to a hole. A hole may indicate that this unit of data was compressed, and may also indicate the particular compression algorithm used to compress this unit of data.

In some instances, it may be necessary to first read a cluster from disk before writing to it. For example, if a unit of data begins or ends within the middle of a cluster, in order to preserve the integrity of the compression unit and to avoid overwriting the data not to be changed, the whole cluster must first be read from disk. For example, if a unit of data within computer memory is to be written to disk, and the unit of data begins halfway through a cluster, the whole cluster should not be written to disk because the first half of the cluster would be overwritten. The whole cluster should be read first from the disk in order to preserve that first half of the cluster which will be unchanged. When the data is read, and a hole indicates that the cluster had been compressed, the data must be expanded first. Once the cluster has been read into a buffer, that portion to be changed is overwritten. The cluster is then compressed and written back to disk. Clusters in which the unit of data neither begins nor ends, need not be first read from disk, but may be written to directly.

In one aspect of the invention, different clusters in a file may contain different types of holes. This allows different compression algorithms to be applied within a given file. Also, files in a file system may be compressed using different types of holes. This allows multiple compression algorithms to be used in the file system on a per file basis.

Various embodiments of the present invention thus extend the concept of files with "holes" to support file system level compression. Accordingly, both compressed and expanded files may co-exist, thus allowing users to take advantage of file system level compression without having to convert the data in an existing storage device all at once, nor having to change the on-disk file system format.

BRIEF DESCRIPTION OF THE DRAWINGS

The invention, together with further advantages thereof, may best be understood by reference to the following description taken in conjunction with the accompanying drawings in which:

FIG. 4b shows an embodiment of a mapping table for the compressed file of FIG. 4a.

FIG. 5b is a flowchart representing a compute write size operation used in one embodiment of the write operation of FIG. 5a.

FIG. 5c is a flowchart representing a write cluster operation used in one embodiment of the write operation of FIG. 5a.

FIG. 5d is a flowchart representing a compute and set file size operation used in one embodiment of the write operation of FIG. 5a.

FIG. 6b is a flowchart representing a compute read size operation used in one embodiment of the read operation of FIG. 6a.

FIG. 6c is a flowchart representing a read cluster operation used in one embodiment of the read operation of FIG. 6a.

FIG. 8b is a flowchart representing a truncate file operation used in one embodiment of the set file size operation of FIG. 8a.

FIG. 8c is a flowchart representing a lengthen file operation used in one embodiment of the set file size operation of FIG. 8a.

DETAILED DESCRIPTION OF THE INVENTION

Figure 1:
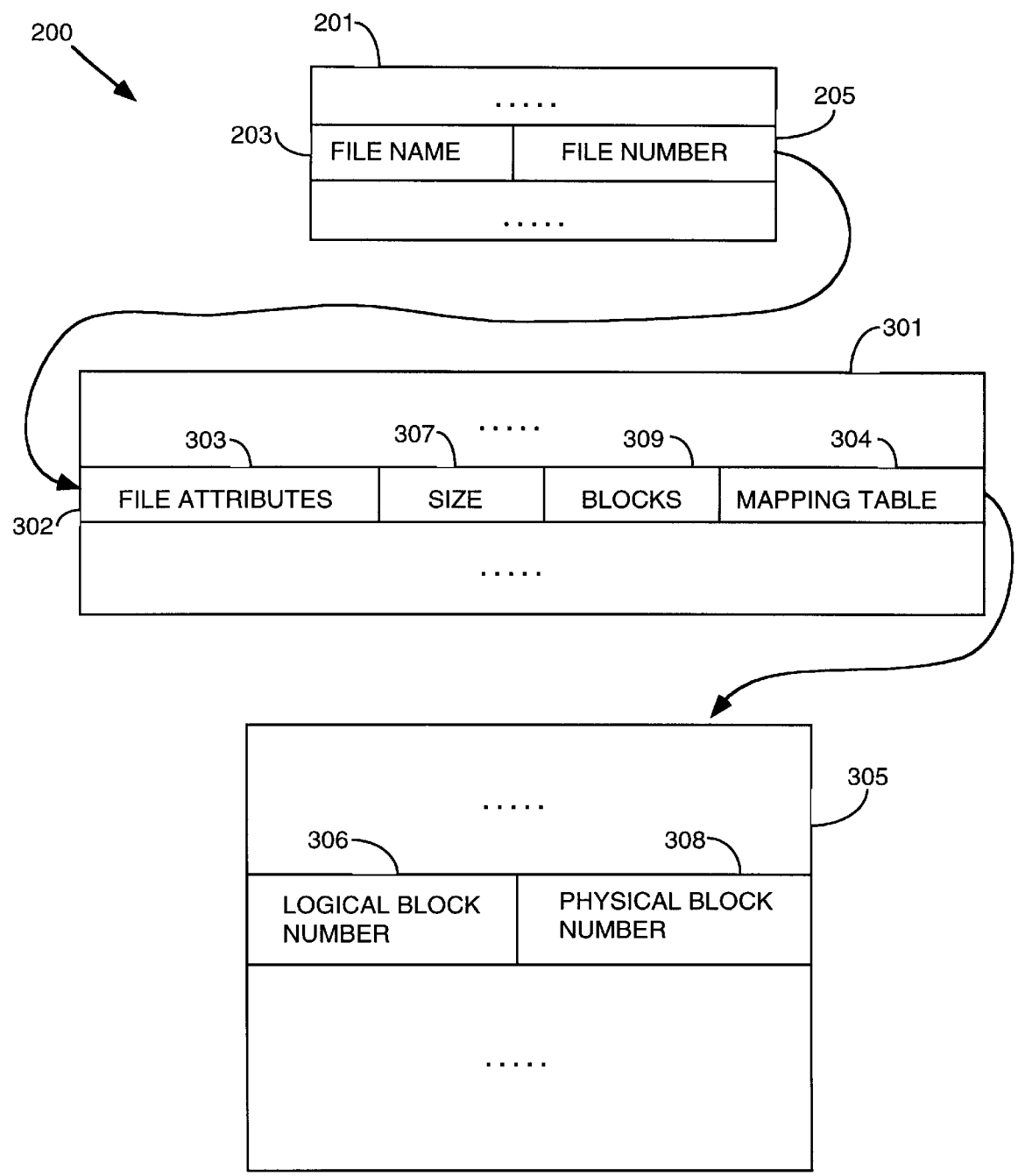
FIG. 1 shows symbolically an example of a file system structure.

FIG. 1 shows in general a structure for a file system 200. The file system has a hierarchy of directory structures 201, a file table 301 and a mapping table 305. There is a mapping table 305 for each entry in the file table 301. Within the directory 201 are entries of file names within the file system and corresponding file numbers that allow files to be indexed to an entry in the file table. Each entry 302 in the file table 301 identifies a file of the file system and is commonly known as an Inode. Shown in particular are a file name 203 and its corresponding file number 205. The pointer file number 205 points to a particular Inode 302 within the file table 301. This Inode 302, or row of the file table 301, contains information about the given file. Inodes are described in "The Design and Implementation of the 4.3BSD UNIX Operating System", Chapter 7, referenced above. Information contained may be various file attributes 303 such as the type of the file and file access control, and in particular the size 307 of the file, and the total number of physical blocks 309 occupied by this file on the disk. Also shown is a mapping table pointer 304 that points to a mapping table for this file. It should be appreciated that other structures are possible for a file system, and that many file systems may be suitable for use with the present invention.

The mapping table 305 contains information on how the logical blocks within a file are mapped to physical blocks on a disk. It should be appreciated that these physical blocks may be present on a hard disk, floppy disk, optical disk or the like. It is also possible that these physical blocks are contained in the physical memory of the computer or a similar storage device. The first entry 306 in the file table 305 maps to the physical block number 308 for logical block number 0 of the file. The next entry contains the mapping for logical block number 1, etc. The size of the file 307 determines the number of entries in the mapping table 305. The physical block number identifies the location on the disk where the logical block is to be stored. The mapping table may also be implemented using an array, list or other similar data structure, or may be implemented in hardware. If using an array, the index of the array may serve to represent the logical block number. It is preferable to implement the mapping table as an array.

Figure 2:
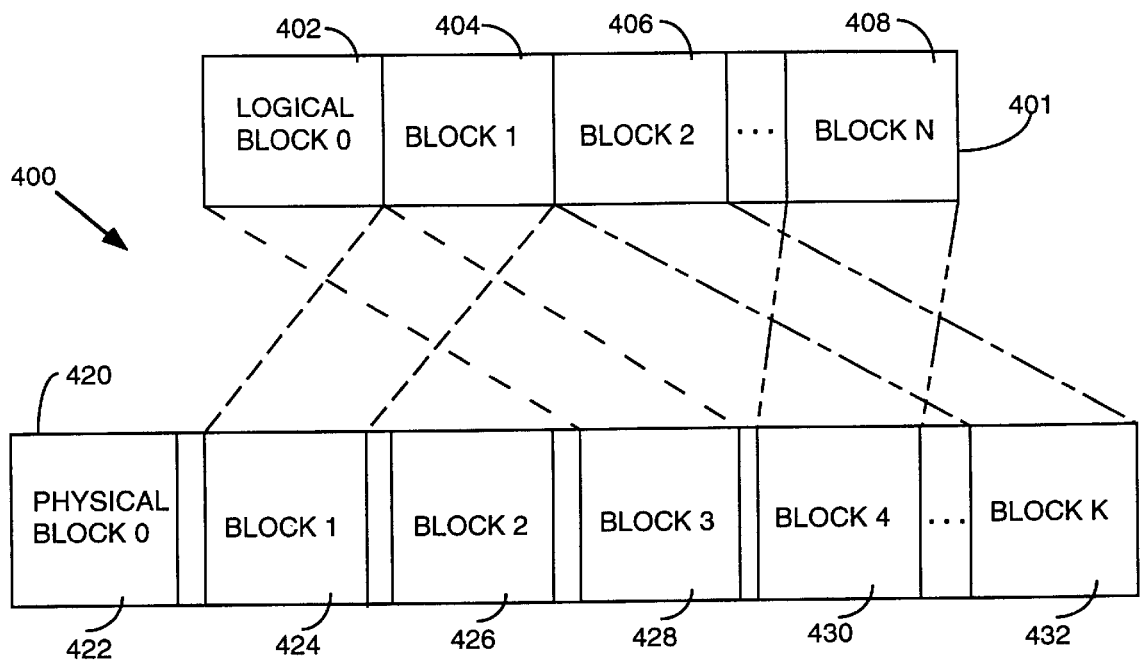
FIG. 2 shows symbolically the mapping of logical blocks within a file to physical blocks in memory or on disk.

FIG. 2 at 400 shows symbolically how the logical blocks of the file may be mapped to physical blocks on a hard disk, for example. Shown is a logical file 401 that would typically be contained within the memory of a computer as it is being operated upon. Also shown is a hard disk 420. A hard disk is typically separated into physical blocks, but it is not always true that the logical blocks of the file are stored in contiguous physical blocks on a hard disk. For example, the logical blocks of logical file 400 are shown being mapped to noncontiguous physical blocks of the hard disk 420. Thus, when the logical file 401 is written to the hard disk the logical blocks will be written to noncontiguous physical blocks. In this example, logical block zero 402 is written to physical block three 428. Logical block one 404 is written to physical block one 424, logical block two 406 is written to physical block K 432 and logical block N 408 is written to physical block four 430. As shown, the logical file 401 is made up of zero to N blocks, but a file may be one block in length or any number of blocks in length. Similarly, the hard disk 420 shows physical blocks zero through K but it should be appreciated that the logical blocks may be written to any of the physical blocks on the hard disk. Thus, it can be appreciated how the mapping table 305 of FIG. 1 is used to indicate to which physical blocks the logical blocks are written. Although a hard disk 420 is used as an example, the resource 420 may be any storage media associated with a computer.

As discussed above, it may be possible that a logical block within a file contains very little data or may in fact be completely empty, that is, the logical block is full of zeroes. For example, if logical block one 404 was completely full of zeroes then this zero block would be written in its entirety to physical block one 424. As noted above, this is not desirable as a physical block completely full of zeroes is a waste of space.

Figure 3:
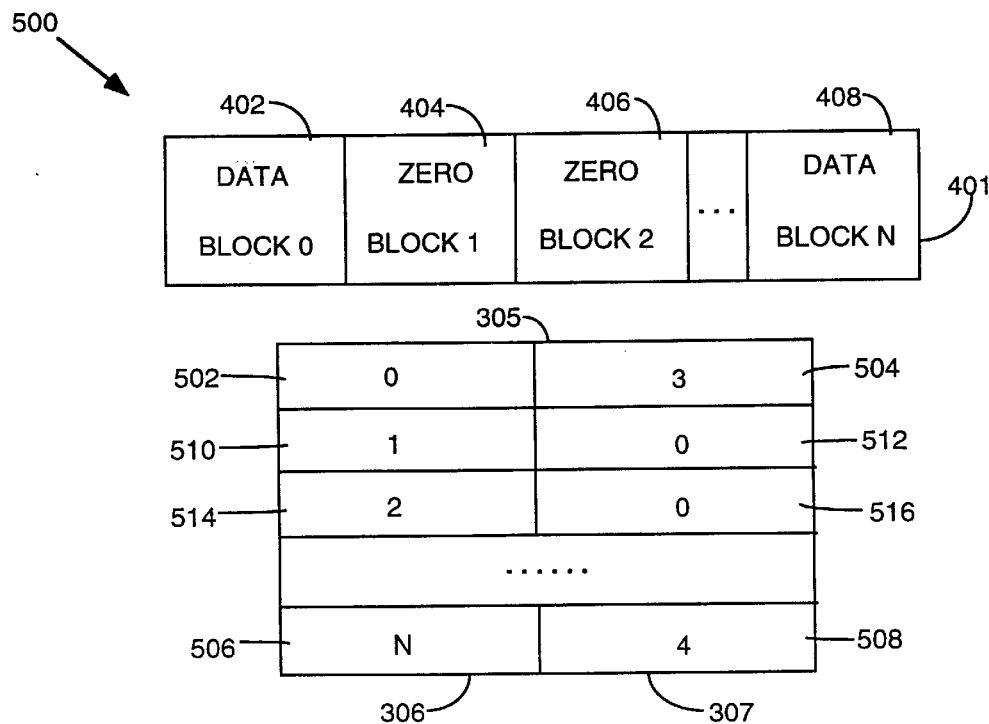
FIG. 3 shows a mapping table for a logical file according to one aspect of the invention.

FIG. 3 demonstrates how the "hole" concept is used to avoid writing a complete physical block full of zeroes. Shown at 500 in FIG. 3 is an example of this technique. Shown is a logical file 401 and its corresponding mapping table 305. In this example, logical file 401 shows four logical blocks, block zero, block one, block two and block N. In this example, logical block zero 402 and logical block N 408 each contain non-zero data. However, logical blocks one and two both contain nothing but zeroes. Referring back to FIG. 2 it can be seen that logical block zero is written to physical block three and logical block N is written to physical block four. The mapping table 305 thus shows logical block zero at 502 being mapped to physical block three at 504. And likewise logical block N at 506 is shown being mapped to physical block four at 508. However, because logical blocks one and two are full of zeroes they will not be written to corresponding physical blocks. Instead the mapping table shows how logical blocks one at 510 and logical block two at 514 are mapped to holes 512 and 516. As shown here, a hole 512 or 516 is represented by the number zero. In this case zero represents a special address, i.e. not an actual physical block address where data will be written but a single address that indicates that the corresponding logical blocks are in fact full of zeroes. It should be appreciated that other techniques may be used to indicate the presence of a hole, aside from using the number zero. By way of example, a hole may be indicated by the presence of an illegal memory address, such as a negative number.

Additionally, the present invention contemplates that an illegal memory address or the like may be used to distinguish a hole created by a compression algorithm from a hole that was pre-existing in a file that had not been compressed. By way of example, a physical block address represented by a zero would indicate that a hole exists in an expanded file, while a physical block address containing a different illegal memory address or the like would indicate that a block or cluster of a file has been compressed.

Figure 4A:
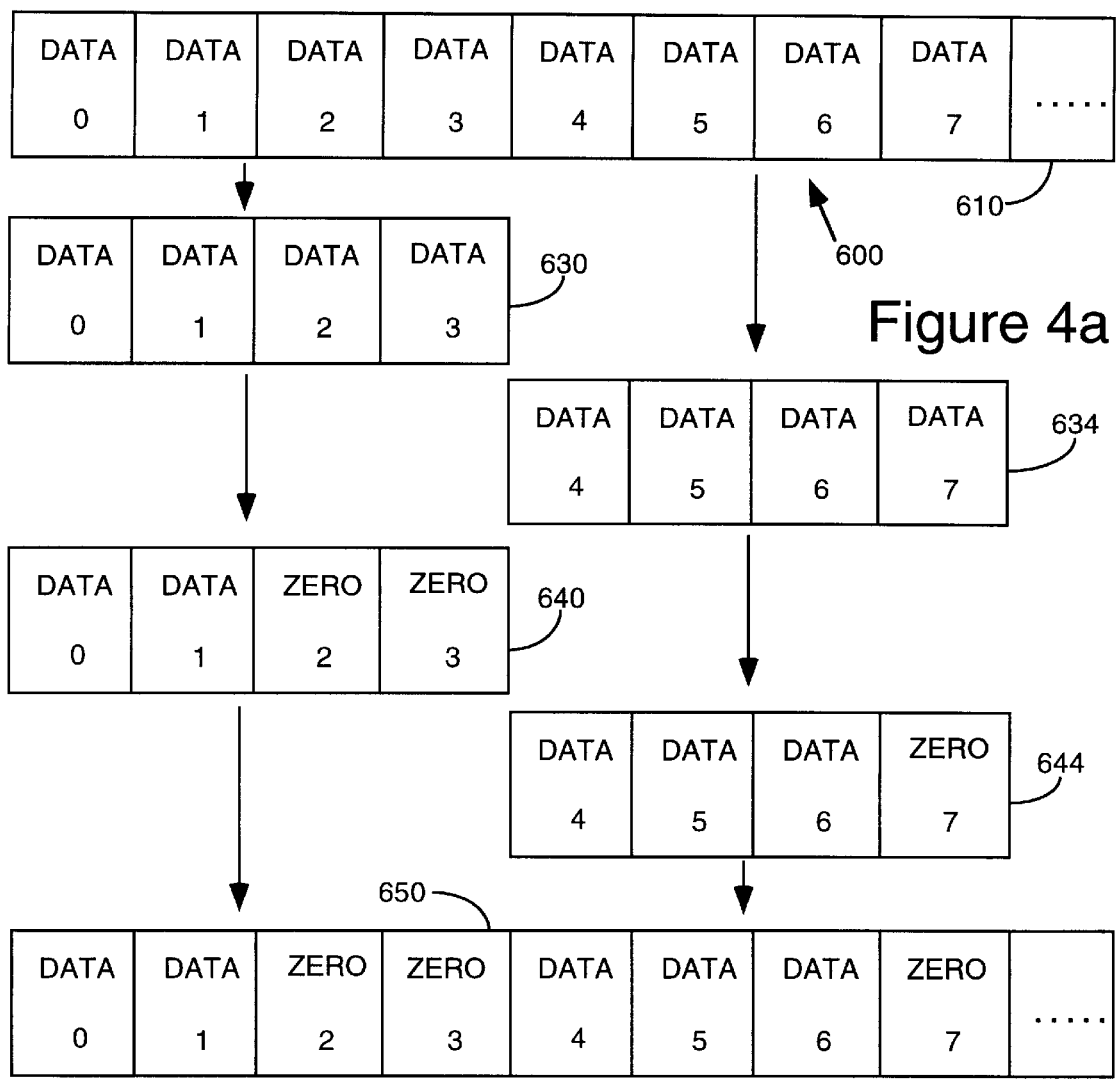
FIG. 4a shows clusters of logical blocks within a file being compressed.
Figure 4B:
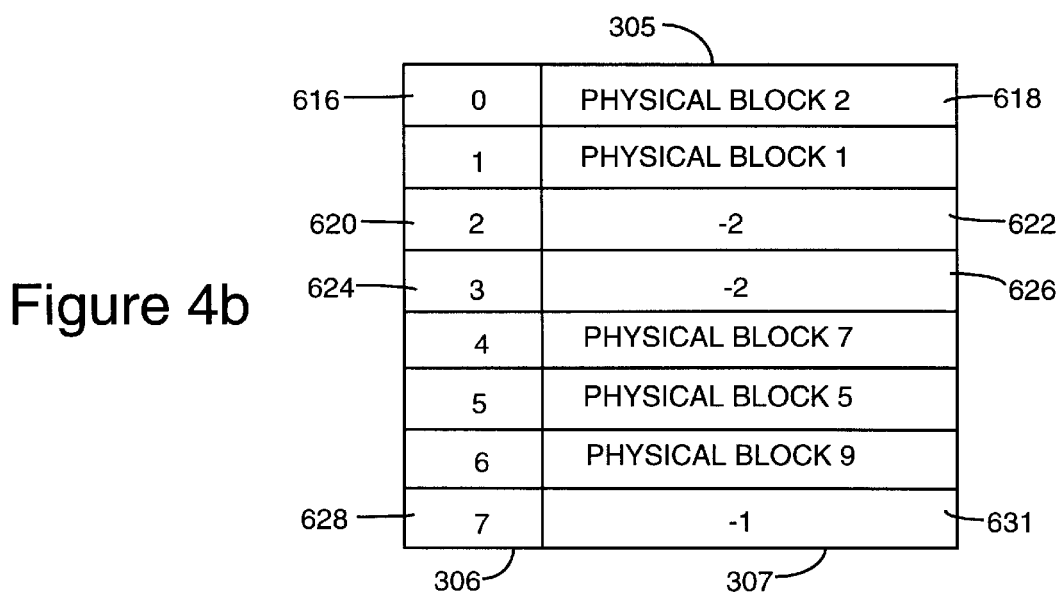

FIGS. 4a and 4b show symbolically an embodiment of the present invention in which compression of a file is performed in a file system that does not typically support compression, by using the concept of holes. FIG. 4a shows at 600 a logical file 610 that is undergoing data compression. Shown in the logical file 610 are logical blocks zero through seven all of which contain data. In this example a cluster in the file system is defined as including four logical blocks. Thus, shown is a first cluster 630 that contains logical blocks zero through three and a second cluster 634 that contains logical blocks four through seven. In this example compression is being performed on a cluster by cluster basis. It should be appreciated that compression may be performed upon a cluster having any suitable size. By way of example, a cluster size of four times or eight times a logical block size is possible, with a cluster size of a minimum of four times the logical block size being preferable. However, a cluster should be greater than the logical block size and be an integer multiple of the logical block size.

In this example, the first cluster 630 is compressed into a compressed cluster 640 in which the data has been reduced by half so that the data is only present in logical blocks zero and one of the compressed cluster 640. Logical blocks two and three of the compressed cluster 640 would then be completely full of zeroes. Similarly, cluster 634 has been compressed into a compressed cluster 644. In this example, the data has only been compressed to seventy-five percent of its original size, therefore, logical blocks four, five and six contain data, whereas logical block seven is all zeros. The compressed representation of this logical file is shown at 650. Logical blocks zero, one, four, five and six all contain data whereas logical blocks two, three and seven are all zeros.

The corresponding mapping table 305 for compressed file 650 is shown in FIG. 4b. Note that the logical blocks that contain valid data are mapped to real physical block addresses. For example logical block zero 616 is mapped to the address of physical block two 618. As logical blocks two, three and seven are all zeroes they are mapped to holes. For example, logical blocks two 620 and three 624 are both mapped to the special address negative two shown at 622 and 626. The number negative two shown at 622 and 626 indicates that the particular cluster has been compressed. Thus, when the cluster is read from disk this negative two can be detected and the cluster can be expanded. In this example, logical block seven 628 has been mapped to the special address negative one 631. In this way, this special address may indicate not only that this cluster has been compressed, but also that a particular compression algorithm has been used to compress the cluster. For example, the special address negative two at 622 may indicate that the first cluster was compressed using one algorithm whereas the special address negative one at 631 might indicate that the second cluster was compressed using a different algorithm. In this fashion, it is possible to compress clusters of one file using different compression algorithms. It would also be possible to compress different files using different compression algorithms.

Figure 5A:
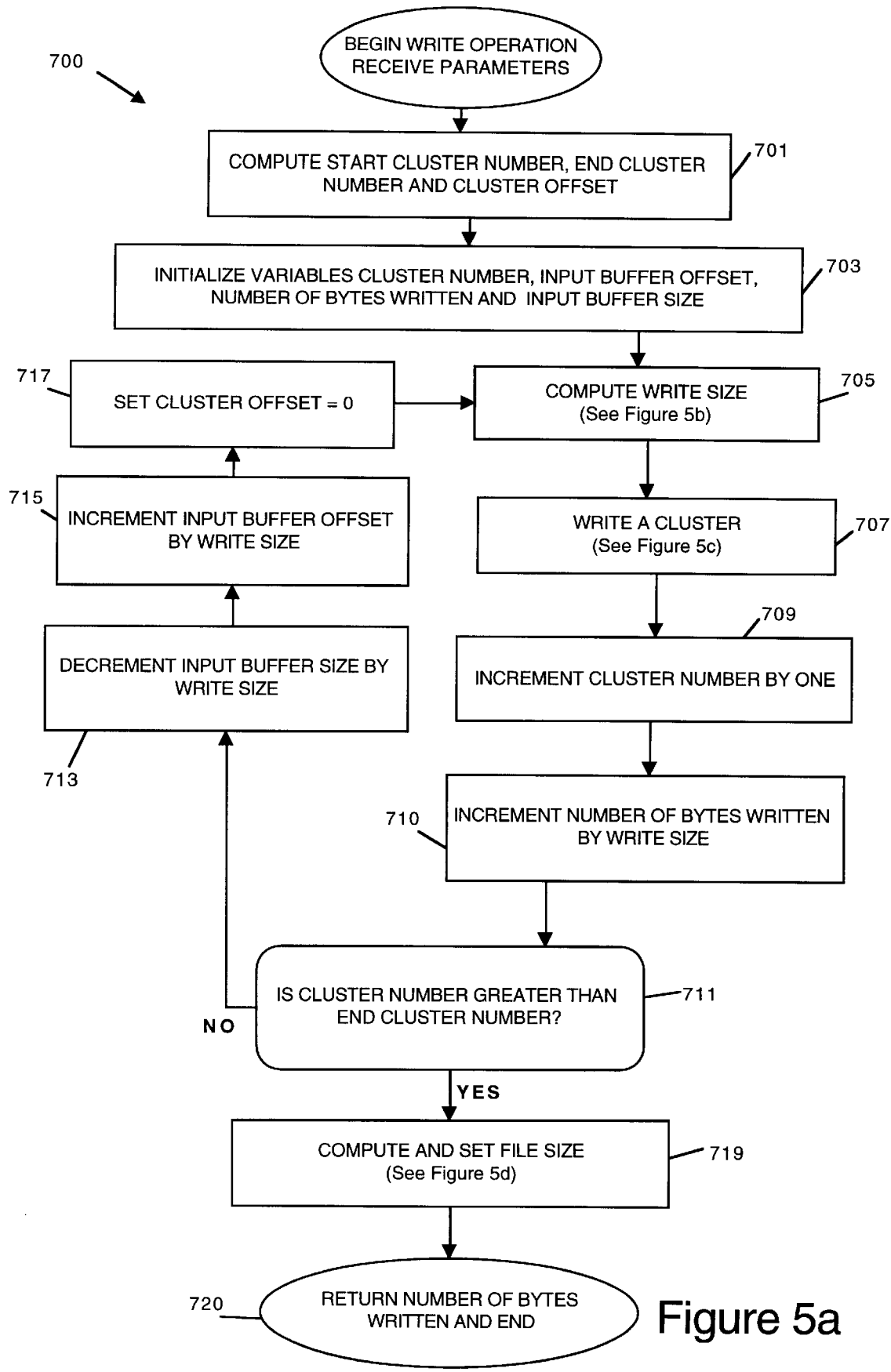
FIG. 5a is a flowchart representing a write operation in accordance with one embodiment of the present invention.

Turning now to FIG. 5a, a flowchart 700 representing the write operation for an embodiment of the present invention is shown. Typically, a file system will accumulate data until the amount of modified data reaches or exceeds the size of a compression unit. The write operation will then compress the data, fill the rest of the cluster with zeroes, replace any physical blocks that contain only zeroes with holes, and write the cluster to disk. The write operation begins by receiving input parameters. Four variables are input to the write operation: the Input Buffer, the Initial Input Buffer Size, a File Offset and an Open File Descriptor. The variable Input Buffer is an address that indicates a data buffer that contains the data to be written to the disk. The Initial Input Buffer Size indicates the size of the Input Buffer in bytes. File Offset is the offset in the file at which data will be written. The Open File Descriptor allows the write operation to access the mapping table for the file that is being written and provides the File Size. The File Size indicates the size of the file that is being written to in bytes. One more variable is available from the file system meta data. It is the variable Cluster Size that represents the size of a cluster in bytes.

After the write operation request has been received, three variables are computed in step 701. They include the Start Cluster Number, the End Cluster Number and the Cluster Offset. The Start Cluster Number is the quotient of the File Offset divided by the Cluster Size. The End Cluster Number is the quotient of: the File Offset plus the Input Buffer Size minus one, all divided by the Cluster Size. The Cluster Offset is the remainder of the File Offset divided by the Cluster Size. The variable Cluster Offset identifies the starting location within the cluster where the data will be written. After these variables have been calculated, the logic proceeds to step 703 where four variables are initialized. They include the Cluster Number, the Input Buffer Offset, Number of Bytes of Written and Initial Input Buffer Size. Cluster Number identifies the cluster to be written and it is set equal to the Start Cluster Number. The Input Buffer Offset indicates the point in the Input Buffer from which the data is being written, and it is initialized to zero. Also, the Number of Bytes Written is set equal to zero and the Input Buffer Size is set equal to the Initial Input Buffer Size. The Input Buffer Offset is the offset within the Input Buffer from which data will be written to the disk.

In step 705 a variable Write Size is computed. This variable indicates the number of bytes to be written in one iteration of this operation and Write Size must be less than or equal to the size of a cluster. This step will be explained in more detail below with reference to FIG. 5b. After the Write Size has been determined, a (first) cluster is written to disk in step 707. This cluster writing step will be explained in more detail below with reference to FIG. 5c. After the first cluster has been written, the Cluster Number variable is incremented by one in step 709. Then, in step 710 the variable Number of Bytes Written is incremented by the Write Size to indicate the number of bytes that have just been written to the disk. At this point, a determination is made as to whether the last cluster for the Input Buffer has been written. This is accomplished by comparing the Cluster Number to the End Cluster Number in step 711. If Cluster Number is greater than the End Cluster Number then the write operation is complete and control moves to step 719. If not, then the write operation is not complete and control moves to step 713.

In step 713 Input Buffer Size is decremented by Write Size to indicate the number of bytes still needed to be written to disk. In step 715 the variable Input Buffer Offset is incremented by Write Size. In step 717 the variable Cluster Offset is set equal to zero because any partial cluster has been written, and remaining clusters will be written from their beginning. From step 717 control loops back to step 705 and the operation continues to another iteration as discussed above. In step 719 the variable File Size is computed and set to indicate the new End of File for the file on the disk. This step will be explained in more detail below with reference to FIG. 5d. In step 720 the write operation ends and the variable Number of Bytes Written is returned to the calling entity.

Figure 5B:
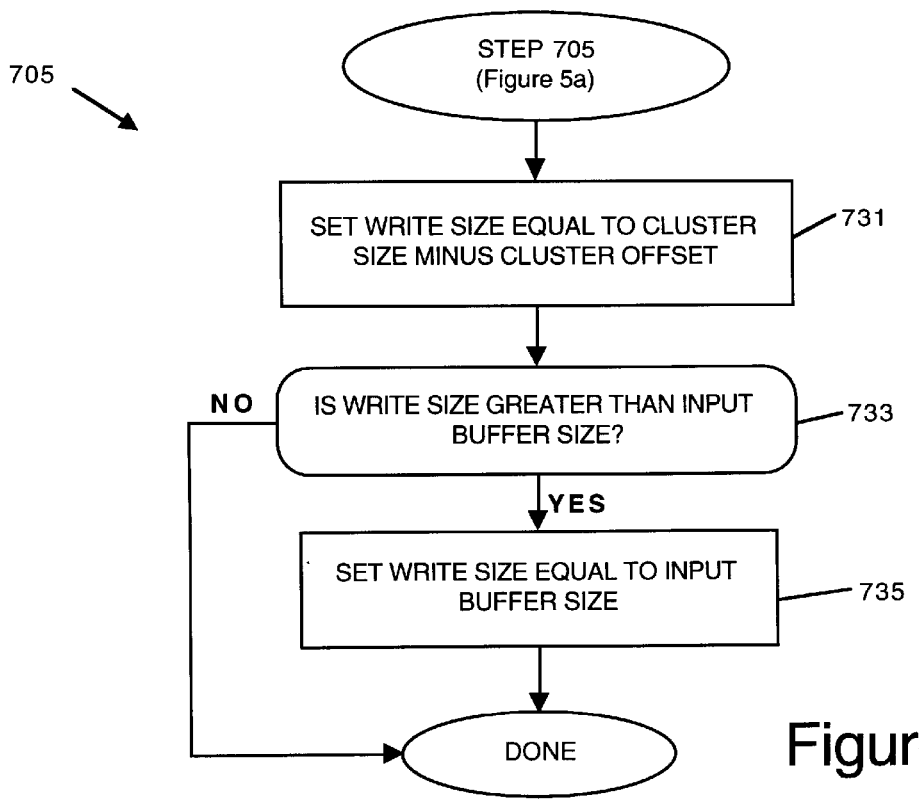

FIG. 5b shows a procedure 705 for computing the Write Size for the number of bytes to be written. For the first and last clusters written, Write Size may not be the same as the Cluster Size because a write may be beginning or ending within a cluster. For intermediate clusters, Write Size will be the same as Cluster Size. In step 731 the Write Size is set equal to the Cluster Size minus the Cluster Offset. The Write Size must be less than or equal to the size of a cluster. In the first iteration of the write procedure the Write Size may be smaller than a Cluster Size if there is a Cluster Offset. That is, if the data to be written to a disk begins in the middle of the cluster. On subsequent iterations through the write procedure Write Size will be equal to the size of a cluster because the Cluster Offset will have been set to zero in step 717. Step 733 tests whether Write Size is greater than the Input Buffer Size. If the Write Size is not greater than the Input Buffer Size this indicates that the data remaining in the Input Buffer to be written is greater than a cluster and the Write Size remains at the size of a cluster and procedure 705 is done.

However, if Write Size is greater than the Input Buffer Size, this indicates that the end of the Input Buffer has been reached, and that the data remaining to be written is less than the size of a cluster. In that case, in step 735 Write Size is set equal to the data remaining, i.e., the Input Buffer Size. Note that the Input Buffer Size changes as iterations are made through the write operation because the variable Input Buffer Size is decremented by Write Size in step 713. After step 735, step 705 compute write size is done.

Figure 5D:
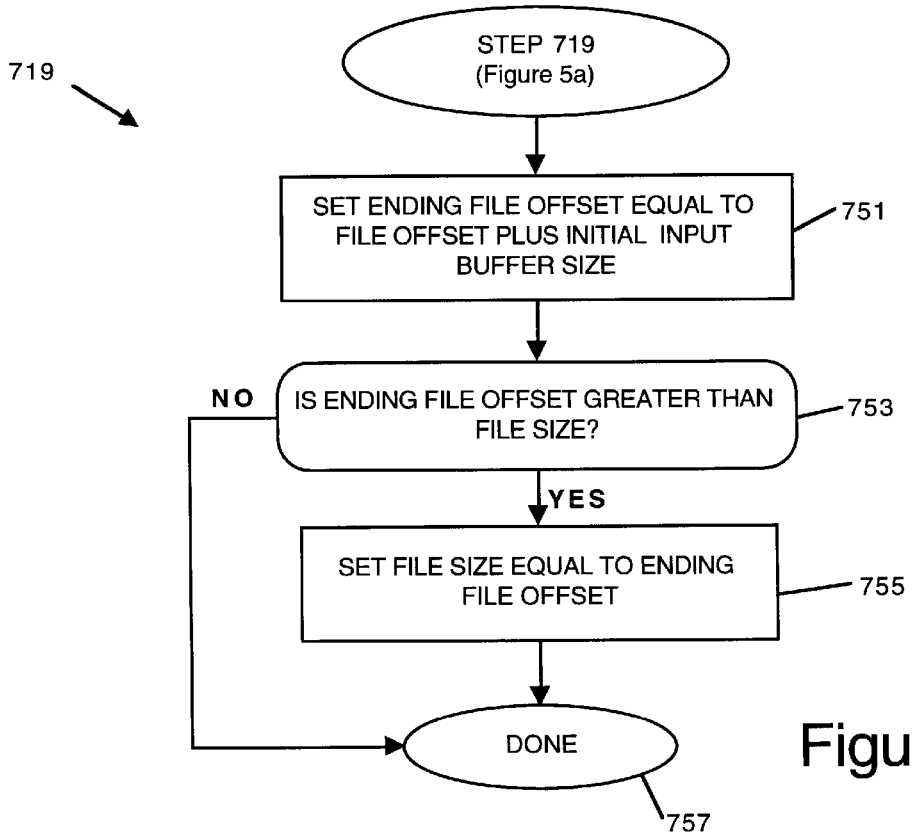
Figure 5C:
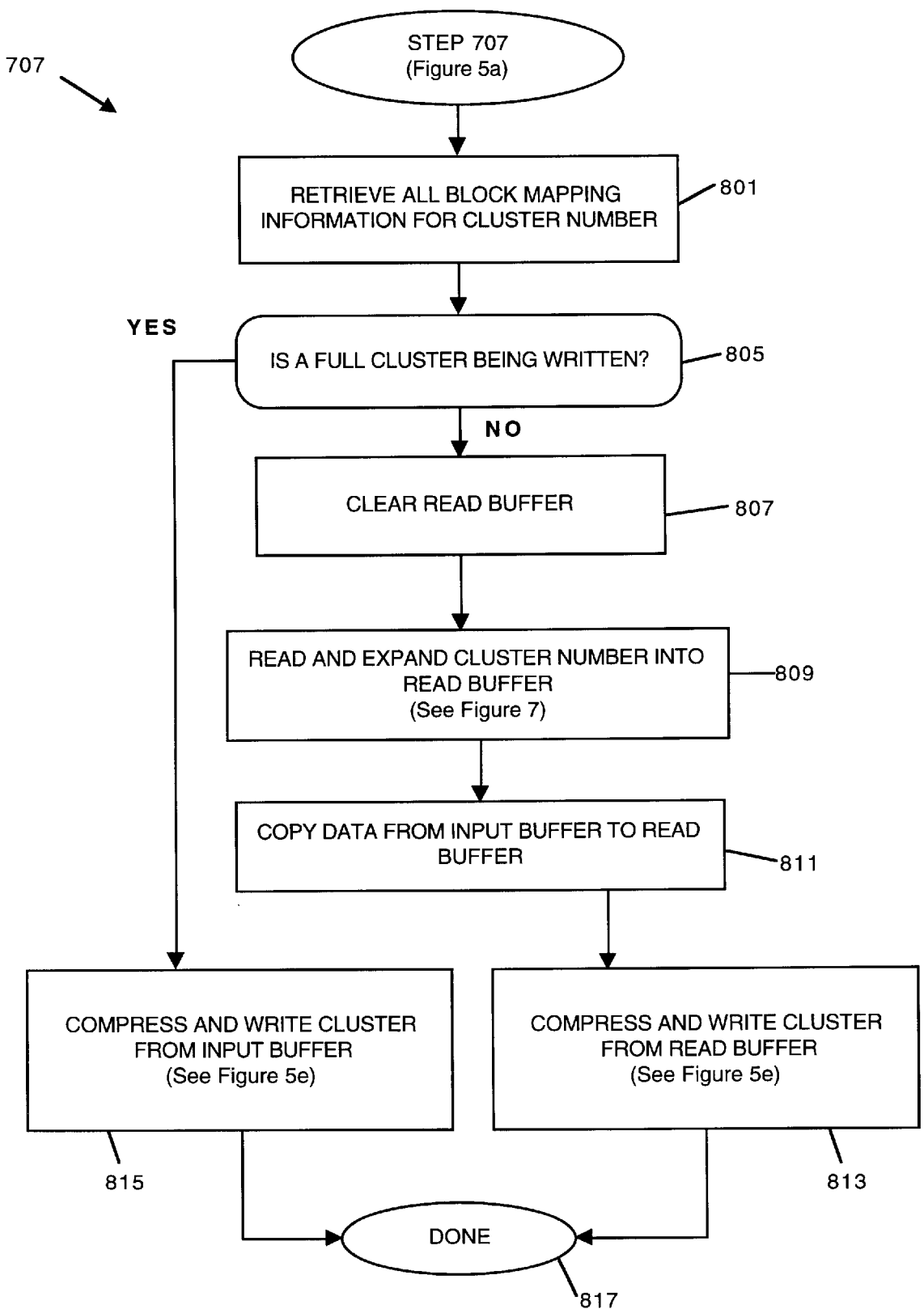

FIG. 5c shows a flowchart 707 that describes a procedure for writing a cluster. In step 801 all block mapping information for the Cluster Number is retrieved. For example, the variable Open File Descriptor can be used to access the mapping table for the file being written to which contains the mapping information for all of the clusters. For example, in FIGS. 4a and 4b it is shown how the mapping information for a first cluster 640 is contained in the mapping table 305.

Step 805 tests whether a full cluster is being written. If a full cluster is being written from the Input Buffer to the output file then the cluster may be written directly. This test may be performed by comparing Write Size to Cluster Size and if Write Size is not equal to Cluster Size, it indicates that a full cluster is not being written. If a full cluster is being written, in step 815 this cluster is compressed and written from the Input Buffer to the open file. This cluster from the Input Buffer is compressed and written to disk using the data stored in the Input Buffer at the location Input Buffer Offset. This step 815 will be explained more fully below with reference to FIG. 5e.

If a full cluster is not being written then this cluster must first be read from the file before being written to as shown in steps 807 to 811. Steps 807 to 813 which are used when a full cluster is not being written describe a situation in which either the Input Buffer begins at an intermediate location within a cluster or ends at an intermediate location within a cluster. If the Input Buffer begins at the beginning of a cluster and ends at the end of a cluster then these steps are not needed. The following variables are used in the steps 807 to 813: Cluster Number is the cluster at which the data will be retrieved, Read Buffer is a temporary data buffer that will contain the data to be retrieved, Cluster Offset is the offset within the Read Buffer at which data from the Input Buffer will be copied to, Input Buffer contains the data to be written, and Input Buffer Offset is a location within the Input Buffer from which the data will be written to disk.

In step 807 the Read Buffer is cleared by setting all bytes in the Read Buffer to zero. In step 809 the cluster associated with Cluster Number is read from the file and expanded if necessary and stored in the Read Buffer. This step 809 will be explained more fully below with reference to FIG. 7. In step 811 data from the Input Buffer is copied to the Read Buffer. This step may be performed by copying Write Size bytes of data from the location at the Input Buffer Offset of the Input Buffer to the location at the Cluster Offset of the Read Buffer. In step 813 the cluster in the Read Buffer is compressed and written to the file on disk. This step will be explained more fully below with reference to FIG. 5e. After steps 815 and 813 have finished this write cluster procedure for step 707 is done at step 817.

FIG. 5d at 719 shows a procedure for calculating the File Size variable. This procedure checks whether the file has increased in size, and if so, adjusts the File Size variable. The variable File Size indicates the size of the file in bytes. In step 751 the variable Ending File Offset is set equal to File Offset plus the Initial Input Buffer Size. As the variable File Offset indicates the offset from the beginning of the file on disk and the variable Initial Input Buffer Size is the total size of the data being written, the variable Ending File Offset will now indicate the new End of File, if the file has increased in length. Step 753 tests whether the Ending File Offset is greater than File Size. If Ending File Offset is not greater than File Size this indicates that the file has not increased in length and the variable File Size is not changed and this procedure is done at 757. If, however, the Ending File Offset is greater than the File Size then in step 755 the variable File Size is reset to be equal to the variable Ending File Offset. After this step the procedure ends at step 757.

Figure 5E:
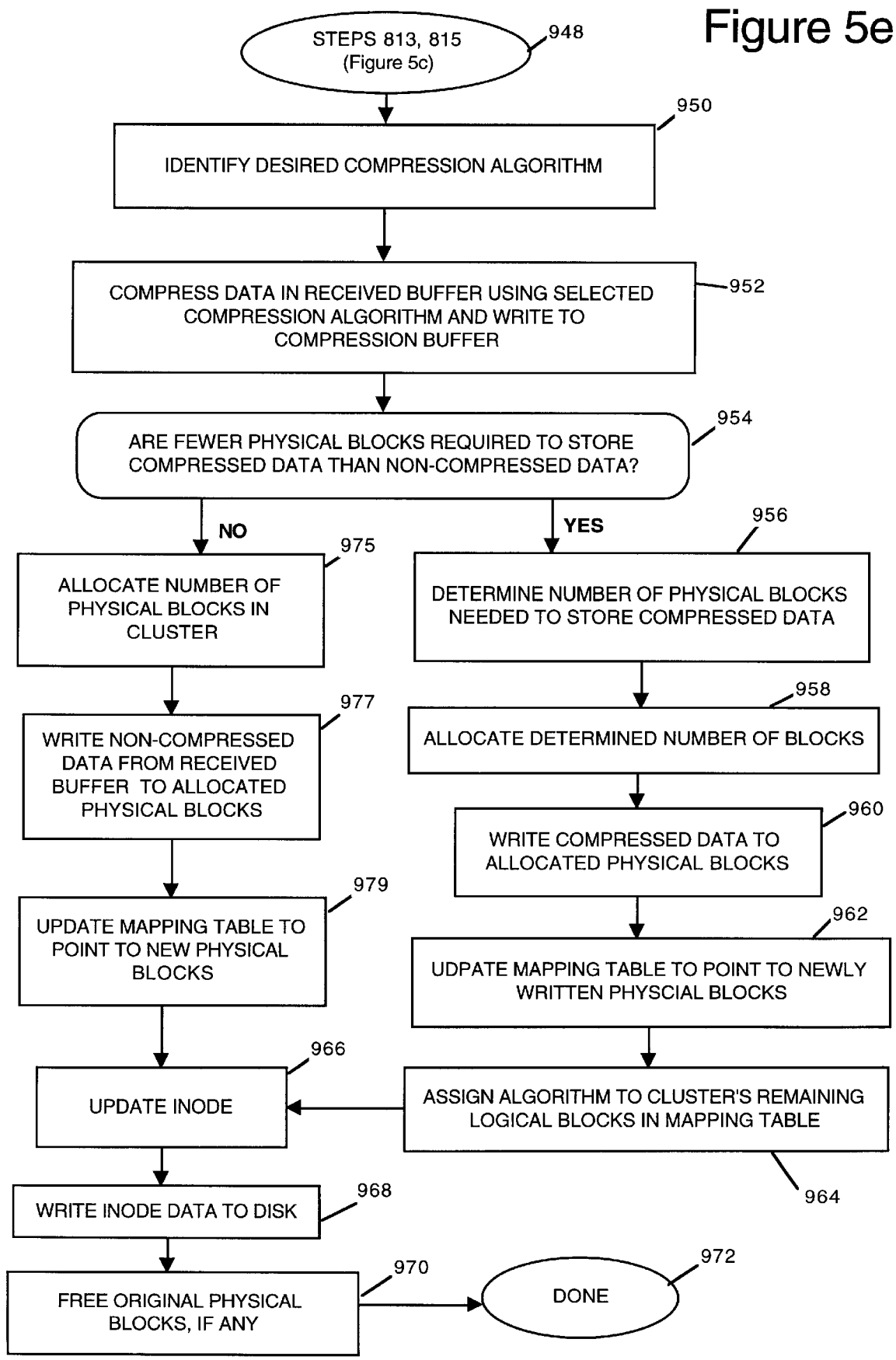
FIG. 5e is a flowchart representing a compress and write cluster operation used in one embodiment of the write cluster operation of FIG. 5c.

FIG. 5e shows a procedure for compressing and writing one cluster to disk. FIG. 5e represents either step 813 or 815 of FIG. 5c. This procedure begins at step 948 by either receiving the Input Buffer or the Read Buffer. In the case of step 813 a cluster will be compressed and written using the data stored in the Read Buffer, whereas in the case of step 815 a cluster will be compressed and written using the data stored in the Input Buffer at the location Input Buffer Offset. Once a buffer is received, a desired compression algorithm for use is identified in step 950. This compression algorithm will be used to compress the data in this cluster. The choice of a compression algorithm is a decision that may be made by the user, the operating system, the file system, or other. The choice of a compression algorithm is independent of this procedure and it should be appreciated that, as explained above, it may be possible to choose a different compression algorithm for use in compressing each cluster.

In step 952 the data in the received buffer is compressed using the selected compression algorithm and this compressed data is written to a Compression Buffer. Step 954 determines whether the compression is useful. In other words, if fewer physical blocks are required to store the compressed data than the expanded data this implies that the compression algorithm has been effective because it has reduced the physical storage size of the data. On the other hand, it may be that the compress ion algorithm has been able to slightly reduce the size of the data but not enough to reduce it by the unit of a physical block (or any other data unit desired). In this case, the same number of physical blocks are required to store the compressed data as the expanded data. Thus, compression would not be useful and will not be used.

If compression is not useful control moves to step 975; if it is determined that compression is useful control moves to step 956. In step 975 the required number of physical blocks to store the data in the cluster are allocated. In step 977 the expanded data from the received buffer is written to the allocated physical blocks on the disk. In step 979 the mapping table is updated to map the logical blocks to the newly written physical blocks. In step 966 the Inode is updated. This update may include updating the size of the file, the blocks within the file or other. In step 968 this updated Inode information is written to the disk to be associated with the file. In step 970 the original physical blocks allocated for this cluster are freed up because new physical blocks have just been written. After step 970 this procedure for step 813 and 815 of FIG. 5c is done at 972.

Returning now to the case where compression would be useful, in step 956 the number of physical blocks needed to store the compressed data are determined. For example, if the chosen compression algorithm was successful in reducing the size of the expanded data by seventy-five percent, in theory only seventy-five percent of the previously used physical blocks for the expanded data would be needed to store the compressed data. In step 958 these determined number of physical blocks are allocated. In step 960 the compressed data is written from the Compression Buffer to the allocated physical blocks on the disk. In step 962 the mapping table is updated to point to the newly written physical blocks. This step 962 is analogous to step 979.

In step 964 the compression algorithm used is assigned to the remaining logical blocks in the mapping table that are associated with the cluster identified by Cluster Number. In other words, because the compression algorithm was successful in reducing the number of physical blocks needed, a certain number of logical blocks need not be mapped to actual physical blocks but may be mapped to a hole. As explained above, this hole may be a special address on disk, it may be an illegal disk address, or the like. By way of example, these logical blocks may be mapped to the special address zero or may be mapped to an illegal address such as negative one or negative two. This special address is useful not only for identifying that a compression algorithm has been used on this cluster, but also for identifying the particular compression algorithm that was used. It should be appreciated that a different compression algorithm may be used with each cluster compressed and a unique special address may be used to identify this compression algorithm. After step 964 control moves to step 966 and flow continues in the procedure as explained above.

Figure 6A:
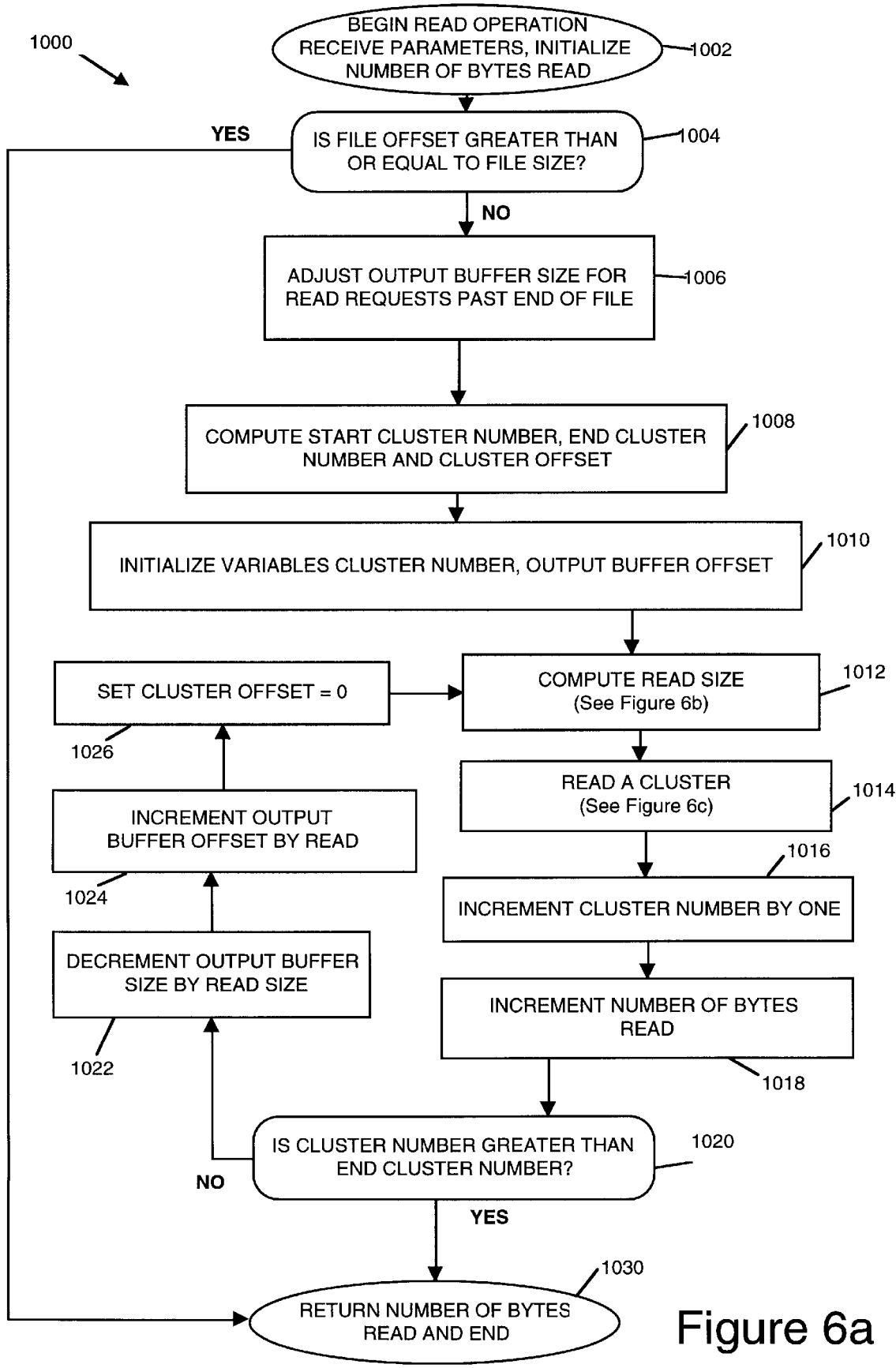
FIG. 6a is a flowchart representing a read operation in accordance with one embodiment the present invention.
Figure 6B:
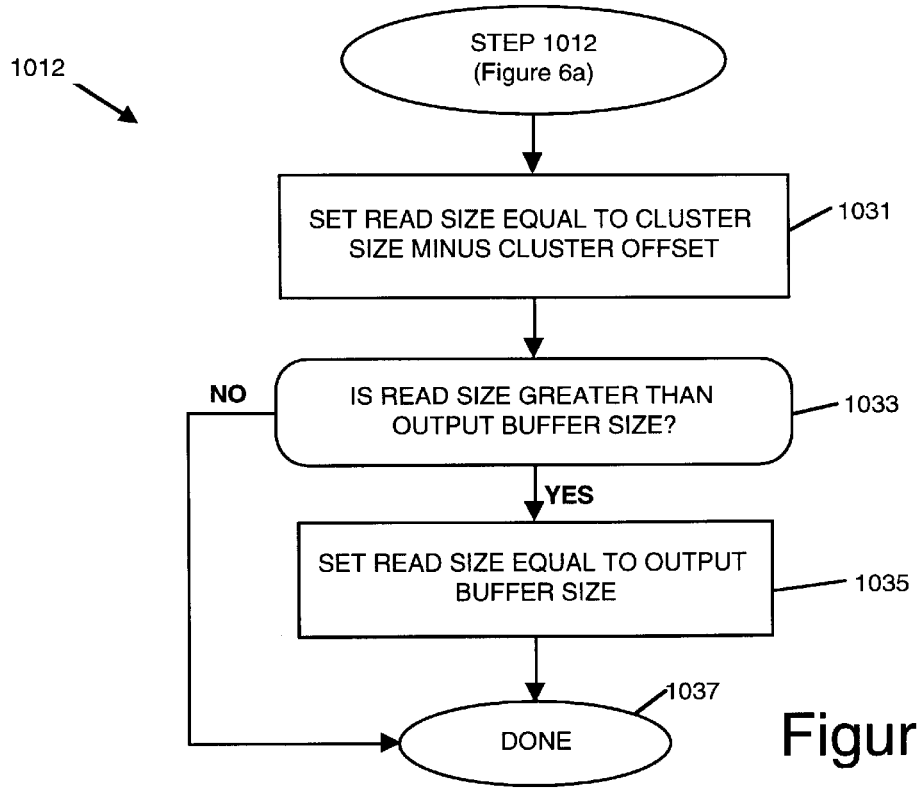
Figure 6C:
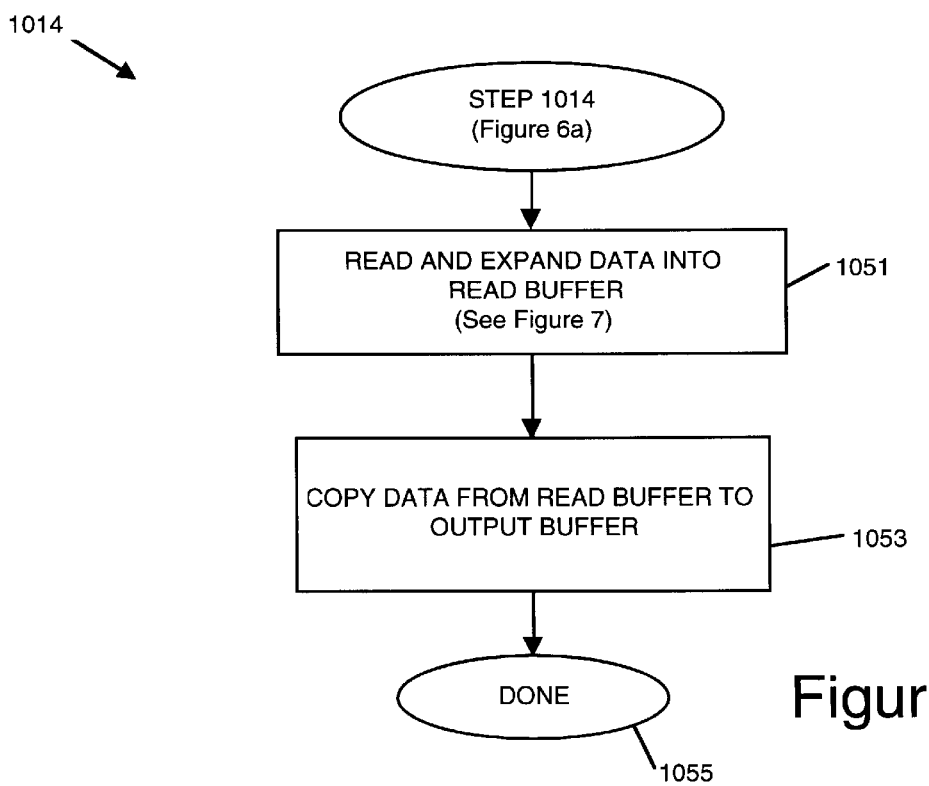

Turning now to FIGS. 6a, 6b and 6c a flowchart 1000 representing a read operation for an embodiment of the present invention is shown. When a user reads a compressed file at a file offset the file system will retrieve the stored compression unit that contains the bytes at the offset, expand the data and return it to the user. The read operation begins by receiving input parameters at 1002. Four variables are input to the read operation: the Output Buffer, the Initial Output Buffer Size, the File Offset and the Open File Descriptor. The variable Output Buffer is an address that indicates a data buffer that will contain the data to be read from the disk. The Initial Output Buffer Size indicates the size of the Output Buffer in bytes. The File Offset is the offset in the file at which the data will be read. The Open File Descriptor allows the read operation to access the mapping table for the file that is being read and provides the File Size. One more variable is available from the file system meta data, the variable Cluster Size represents the size of a cluster in bytes. Also, the variable Number of Bytes Read is initialized to zero.

In step 1004 the File Offset is compared to the File Size. If File Offset is greater than or equal to the File Size this indicates that an attempt to read past the end of the file exists and the read procedure will end at step 1030. On the other hand, if File Offset is less than File Size then control moves to step 1006. In step 1006, the Output Buffer Size is first set to the Initial Output Buffer Size. The Output Buffer Size may be further adjusted if it is determined that the read operation will request data past the end of the file. If the Output Buffer Size is greater than File Size minus File Offset, this means the request is past the end of the file. If so, Output Buffer Size is set to File Size minus File Offset.

In step 1008 three variables are computed, namely Start Cluster Number, End Cluster Number and Cluster Offset. The variable Start Cluster Number is the quotient of the File Offset divided by the Cluster Size. The End Cluster Number is the quotient of: the File Offset plus the Output Buffer Size minus one, all divided by the Cluster Size. The Cluster Offset is the remainder of the File Offset divided by the Cluster Size. The variable Cluster Offset identifies the location within the cluster from where the data will be read. Once these variables are computed, three variables are initialized in step 1010. Cluster Number identifies the cluster to be read and it is set equal to the Start Cluster Number. The Output Buffer Offset indicates the point in the Output Buffer to store the data being read from disk, and it is initialized to zero. The Output Buffer Offset is the offset within the Output Buffer to store the data that will be read from the disk.

In step 1012 the variable Read Size is computed. This variable indicates the number of bytes to be read in one iteration of this operation and Read Size must be less than or equal to the size of a cluster. This step will be explained in more detail below with reference to FIG. 6b. In step 1014 a cluster is read from disk. This step will be explained in more detail below with reference to FIG. 6c. In step 1016 the Cluster Number is incremented by one. In step 1018 the variable Number of Bytes Read is incremented by Read Size to indicate the number of bytes that have just been read from the disk. Next, step 1020 tests whether the last cluster for the Output Buffer has been read. If Cluster Number is greater than the End Cluster Number then the read operation is complete and control moves to step 1030. If not, then the read operation is not complete and control moves to step 1022.

In step 1022 Output Buffer Size is decremented by Read Size to indicate the number of bytes read from disk. In step 1024 the variable Output Buffer Offset is incremented by Read Size. In step 1026 the variable Cluster Offset is set equal to zero. From step 1026 control loops back to step 1012 and the operation continues to another iteration as discussed above. In step 1030 the read operation ends and the variable Number of Bytes Read is returned to the calling entity.

FIG. 6b shows a procedure to implement step 1012 of FIG. 6a for computing Read Size, the number of bytes to be read. In step 1031 Read Size is set equal to the Cluster Size minus the Cluster Offset. The Read Size must be less than or equal to the size of a cluster. In the first iteration of the read procedure the Read Size may be smaller than a Cluster Size if there is a Cluster Offset. That is, if the data to be read from a disk begins in the middle of the cluster. On subsequent iterations through the read procedure Read Size will be equal to the size of a cluster because the Cluster Offset will have been set to zero in step 1026. Step 1033 tests whether Read Size is greater than the Output Buffer Size. If the Read Size is not greater than the Output Buffer Size this indicates that the data remaining on the disk to be read to the Output Buffer is greater than or equal to a cluster and the Read Size remains at the size of a cluster and procedure 1012 is done.

However, if Read Size is greater than the Output Buffer Size, this indicates that the end of the Output Buffer has been reached, and that the data remaining to be read is less than the size of a cluster. In that case, in step 1035 Read Size is set equal to the data remaining to be read, namely, the Output Buffer Size. Note that the Output Buffer Size changes as iterations are made through the read operation because the variable Output Buffer Size is decremented by Read Size in step 1022. After step 1035, step 1012 compute read size is done.

FIG. 6c shows a procedure for executing the read cluster operation that is step 1014 of FIG. 6a. This operation begins at step 1051. In step 1051 data associated with Cluster Number is read from the disk and expanded and stored in the Read Buffer. This step 1051 is explained more fully below with reference to FIG. 7. In step 1053 a cluster of data is copied from the Read Buffer into the Output Buffer. This step may be performed by copying data in the Read Buffer from Cluster Offset for Read Size number of bytes to the Output Buffer at the offset Output Buffer Offset. At step 1055 this step 1014 is done.

Figure 7:
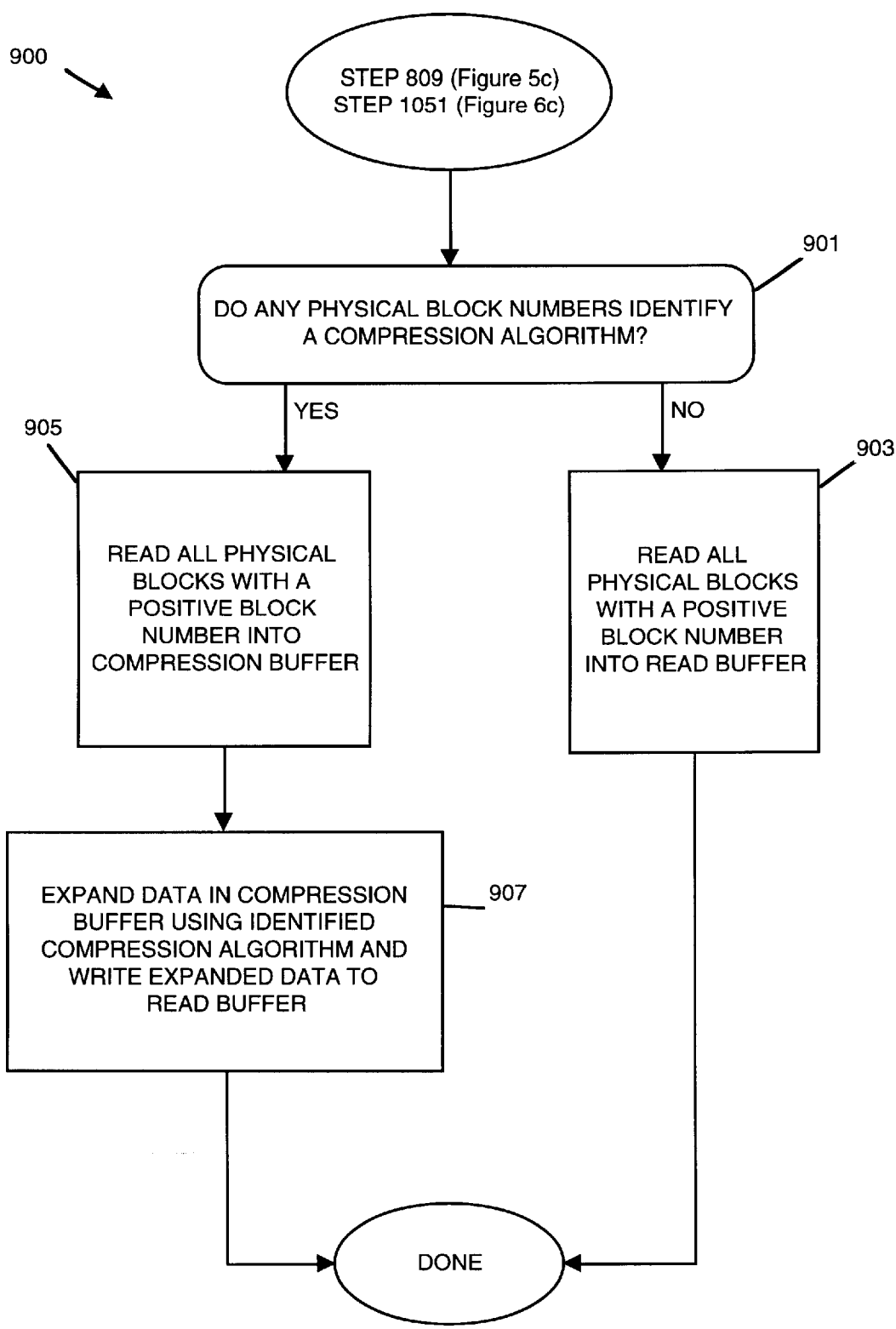
FIG. 7 is a flowchart representing a read and expand operation in accordance with one embodiment of the present invention that may be used in both the write and read operations.

FIG. 7 at 900 shows a procedure for reading data from a disk, expanding it if necessary, and leaving this data in the Read Buffer. This procedure 900 corresponds to step 809 of FIG. 5c and step 1051 of FIG. 6c. Step 901 determines if any physical block numbers of the cluster identify a compression algorithm. As explained above, a compression algorithm may be identified by the presence of a hole in the mapping table. For example, instead of a valid physical block number, a special address, an illegal address, or the like would appear in the mapping table to indicate that a hole is present and that a cluster had been compressed.

If a compression algorithm is identified control moves to step 905, otherwise control moves to step 903. In step 905 all physical blocks with a positive block number (or that are not designated as holes) are read from disk and stored in the Compression Buffer. In this example, a special address such as zero or a negative number may be used to indicate a hole, thus, any positive block numbers indicate that a valid physical block containing data exists at that location. It should be appreciated that valid physical blocks containing data need not necessarily be associated with a positive physical block number, but may be associated with any physical block number that has not been predetermined to indicate a hole. In step 907 the data in the Compression Buffer is expanded using the identified compression algorithm and is then written to the Read Buffer. After step 907 the procedure ends.

If a compression algorithm has not been identified in step 901 then in step 903 all physical blocks with a positive block number are simply read directly into the Read Buffer without undergoing expansion. In this step as well, positive block numbers are used to indicate that a valid physical block of data exists, whereas a block number of zero would indicate that a hole exists. After step 903 the procedure is done.

The set File Size operation is used by the file system to either decrease the size of a file on disk or increase the size of a file on disk. It may also be used to reclaim space at the end of a file. By way of example, if a user is editing a file in the memory of the computer and decreases the size of that file, when that file is then written to disk the set File Size operation may be used instead of the previously discussed write operation. The set file size operation may also be used to increase the file size. The result of the set file size operation is that the size of the file is changed from the old File Size to the New File Size that is input to the operation. The New File Size may be greater than, less than or equal to the old File Size. If the old File Size and New File Size are the same then no steps are performed. Otherwise the file is either lengthened or truncated.

Figure 8A:
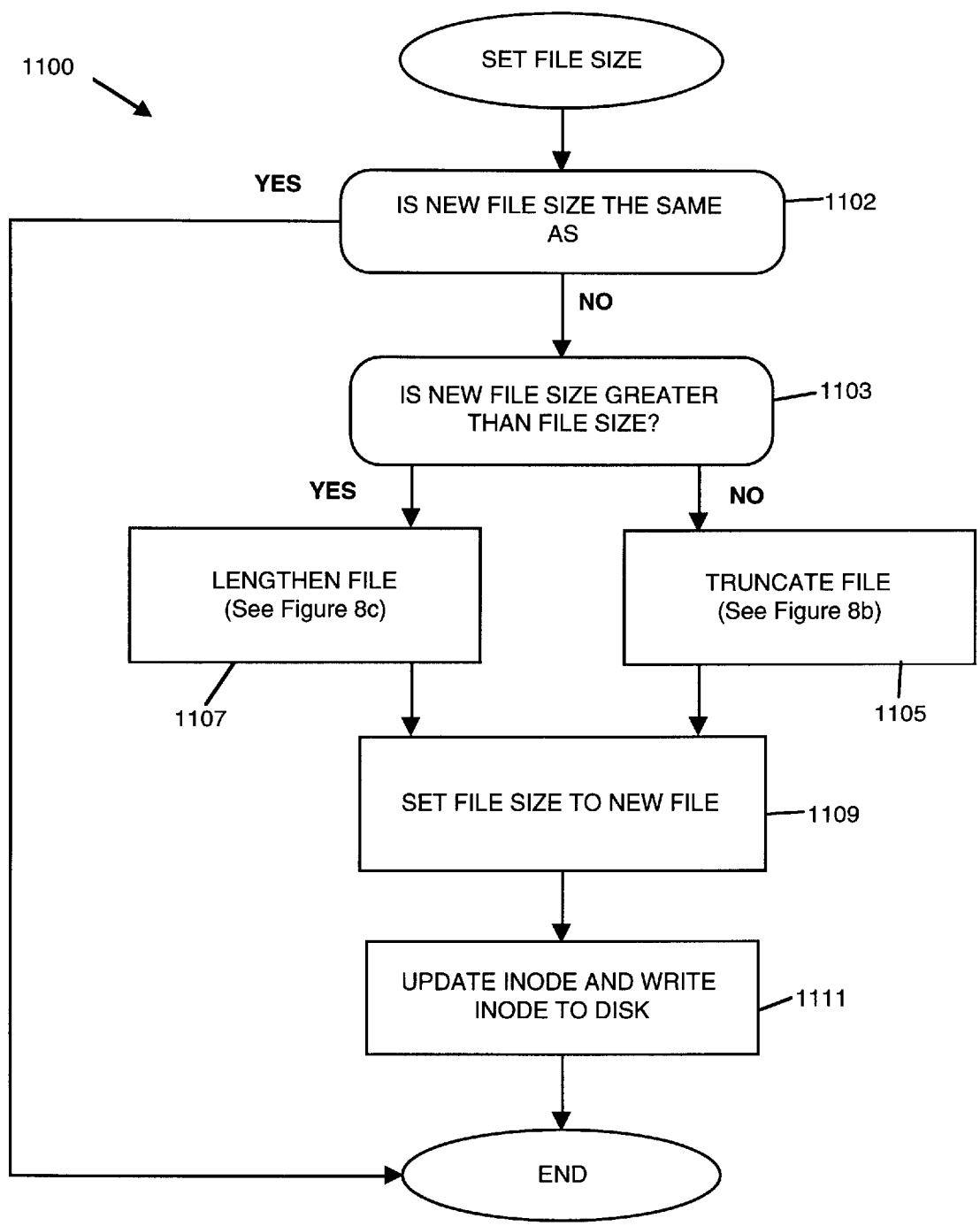
FIG. 8a is a flowchart representing a set file size operation in accordance with one embodiment of the present invention.

FIG. 8a at 1100 shows a flowchart for executing the set file size operation. The set file size operation begins by receiving as input the parameter New File Size that indicates in bytes the desired size of the new file. In step 1102 the New File Size is compared to the current File Size. If both are the same then the set file size operation terminates. If they are not the same, then the New File Size is compared against the File Size in step 1103. If the New File Size is greater than File Size this indicates that the file must be lengthened and the lengthen file step 1107 is performed. This step will be explained in more detail below with reference to FIG. 8c. If New File Size is less than File Size this indicates that the file must be decreased in size and the truncate file step 1105 is performed. This step will be explained in more detail below with reference to FIG. 8b. In step 1109 the variable File Size is reset to New File Size. In step 1111 the Inode information for the file is updated and this Inode is then written to disk. After step 1111 the set file size operation terminates.

FIG. 8b shows a flowchart for performing the truncate file step 1105 from FIG. 8a. The goal of the truncate file step is to zero out the bytes after the pointer New File Size to the end of the cluster. Then, any clusters after the cluster containing the offset New File Size are freed. In step 1151 the variables Write Size and Write Offset are computed. The variable Write Offset represents a pointer that indicates the location in the file from which the bytes must be zeroed out. The variable Write Offset is set equal to New File Size. The variable Write Size represents the number of remaining bytes at file offset New File Size up to the end of the cluster that must be zeroed out. The temporary variable Temporary Write Size is set equal to Cluster Size minus the remainder of New File Size divided by Cluster Size. Next, if New File Size equals zero or if Temporary Write Size equals Cluster Size then Write Size is set equal to zero. Otherwise, Write Size is set equal to Temporary Write Size.

If Write Size equals zero then no bytes need to be zeroed out and clusters can be freed. In step 1153 if Write Size equals zero then control moves to step 1159, if not, then control moves to step 1155. In step 1155 the Write Buffer is cleared. The Write Buffer will have the size equal to Cluster Size. In step 1157 Write Size number of bytes will be written from the Write Buffer to the file starting at the Write Offset. Because this is a write operation, step 1157 may be implemented by using the write operation shown at 700 in FIGS. 5a to 5e. Four variables will be passed to this write operation. As described above, flowchart 700 requires four inputs, namely, an Input Buffer, an Input Buffer Size, a File Offset and an Open File Descriptor. In step 1157 Write Buffer corresponds to Input Buffer, Write Size corresponds to Input Buffer Size, Write Offset corresponds to File Offset and Open File Descriptor that identifies the current file that had been input to the set file size operation above is passed to the write operation.

Steps 1159 through 1167 represent the steps through which the remaining clusters after the cluster containing New File Size are freed up. In step 1159 the variables Start Cluster Number and End Cluster Number are computed. These variables may be computed as explained above, for example, as in step 701 of FIG. 5*a*. If, however, the Write Size is equal to zero, then Cluster Number should also be decremented by one. In step 1161 Cluster Number is incremented by one. In step 1163 Cluster Number is compared to End Cluster Number. If Cluster Number is greater than End Cluster Number then step 1105 is done. If not, then this indicates that a cluster needs to be freed. In step 1165 the block mapping information for this cluster is retrieved. This process may be performed as explained above, for example, as in step 801 of FIG. 5*c*. Also, the original blocks in this cluster are freed. In step 1167 the mapping table is updated and all blocks in this current cluster are set equal to zero. Essentially, these blocks that are now zero are marked as holes. After step 1167 the loop continues to step 1161, Cluster Number is incremented by one to indicate the next cluster, and operation continues as described above.

Figure 8C:
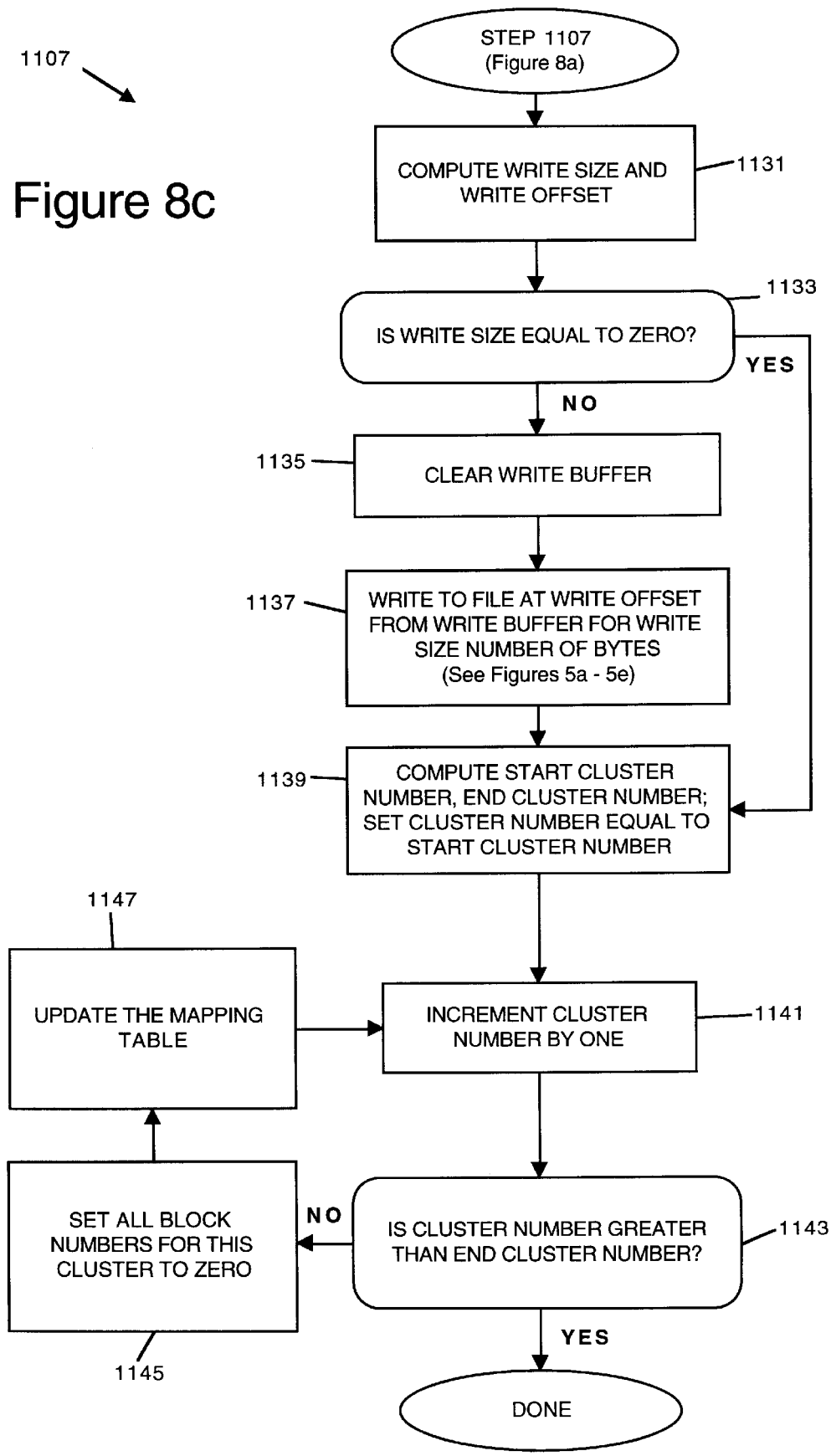

FIG. 8*c* shows step 1107 from FIG. 8*a* which is the lengthen file step. The goal of this lengthen file step is to zero out all the bytes after the old File Size to the end of the cluster. Then the blocks in any clusters after the cluster containing the offset old File Size are marked as holes. In step 1131 the variables Write Size and Write Offset are computed. The variable Write Offset represents a pointer that indicates the location after the file from which the bytes must be zeroed out. The variable Write Offset is set equal to New File Size. The variable Write Size represents the number of remaining bytes at file offset New File Size up to the end of the cluster that must be zeroed out. The variable Write Offset is set equal to the old File Size plus one. Next, the temporary variable Temporary Write Size is set equal to Cluster Size minus the remainder of the New File Size divided by Cluster Size. Next, if the old File Size equals zero or if Temporary Write Size equals Cluster Size then Write Size is set equal to zero. Otherwise, Write Size is set equal to Temporary Write Size.

If Write Size equals zero then no bytes need to be zeroed out and clusters can be marked as holes. In step 1133 if Write Size equals zero then control moves to step 1139, if not, then control moves to step 1135. In step 1135 the Write Buffer is cleared. The Write Buffer will have a size equal to Cluster Size. In step 1137 Write Size number of bytes will be written from the Write Buffer to the file starting at the Write Offset. Because this is a write operation, step 1137 may be implemented by using the write operation shown at 700 in FIGS. 5*a* to 5*e*. Four variables will be passed to this write operation. As described above, flowchart 700 requires four inputs, namely, an Input Buffer, an Input Buffer Size, a File Offset and an Open File Descriptor. In step 1137 Write Buffer corresponds to the Input Buffer, Write Size corresponds to Input Buffer Size, Write Offset corresponds to File Offset and the Open File Descriptor that identifies the current file that had been input to the set file size operation above is also passed to the write operation. After the write operation is complete, control moves to step 1139.

Steps 1139 though 1147 perform the function of marking all the blocks in the clusters after the cluster containing the variable old File Size as holes. In step 1139 the variables Start Cluster Number and End Cluster Number are computed. These variables may be computed as explained above, as in step 701 of FIG. 5*a*. If, however, the Write Size is equal to zero, then Cluster Number should also be decremented by one. In step 1141 Cluster Number is incremented by one. In step 1143 Cluster Number is compared to End Cluster Number. If Cluster Number is greater than End Cluster Number then step 1107 is done. If not, more clusters need to be marked as holes. In step 1145 all block numbers for this cluster are set equal to zero, which means these blocks are holes. In step 1147 the mapping table is updated to reflect these blocks are now marked as holes. After step 1147 the loop continues to step 1141, Cluster Number is incremented by one indicating the next cluster, and operation continues.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that can be executed by the computer using an interpreter.

Figure 9:
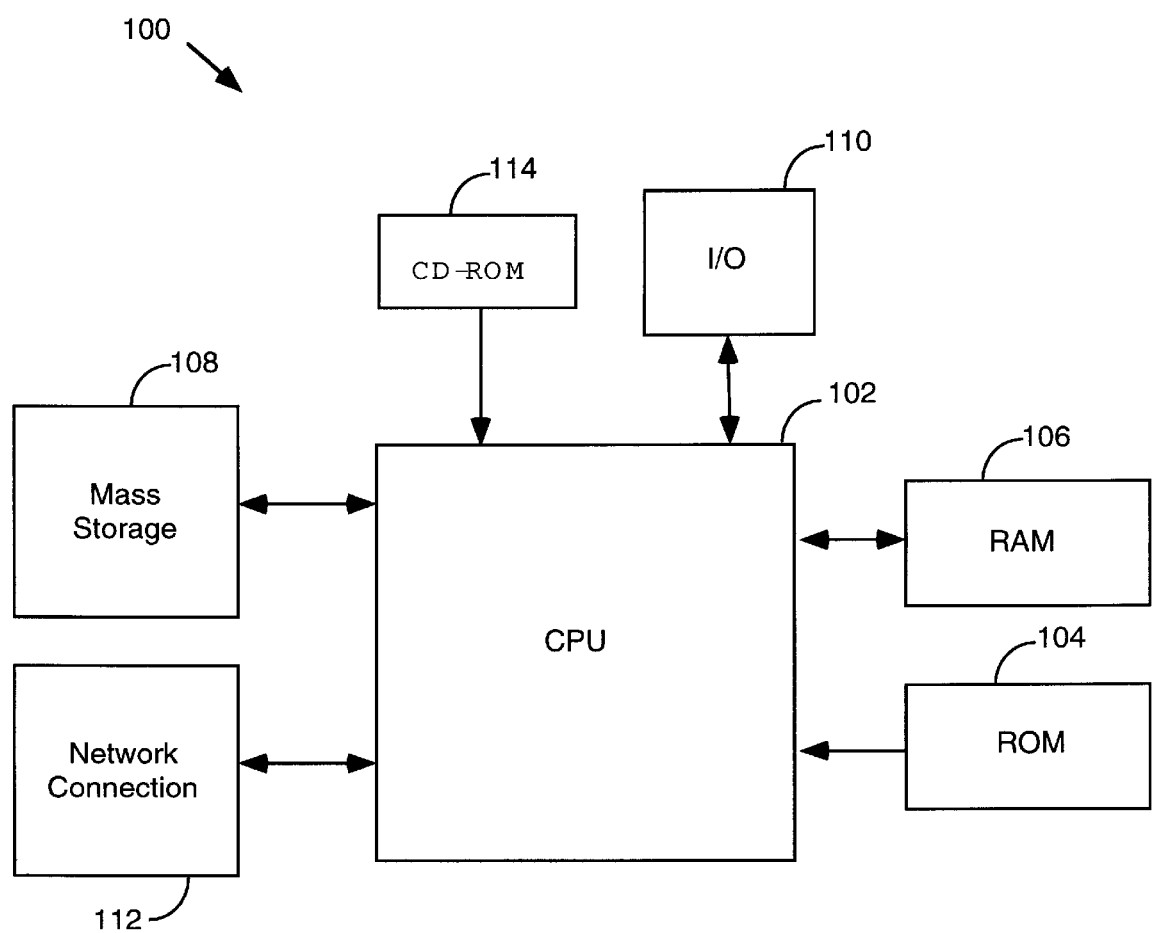
FIG. 9 shows a typical computer system suitable for implementing the present invention.

FIG. 9 illustrates a typical computer system in accordance with the present invention. The computer system 100 includes a central processing unit 102 (CPU) coupled to memory devices including read only memory 104 (ROM) and random access memory 106 (RAM). As is known in the art, ROM 104 acts to transfer data and instructions uni-directionally to the CPU and RAM 106 is used typically to transfer data and instructions bi-directionally. A mass memory device 108 is also coupled bi-directionally to CPU 102 and provides additional data storage capacity. The mass memory device 108 may be used to store programs, data and the like and may take the form of a magnetic or paper tape reader or some other well-known device. It will be appreciated that the information retained within the mass memory device 108, may, in appropriate cases, be incorporated in standard fashion as part of RAM 106 as virtual memory. A specific mass storage device such as a CD-ROM 114 may also pass data uni-directionally to the CPU.

CPU 102 is also coupled to one or more input/output devices 110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally can be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, a compressed file may be written to any storage media associated with a computer. Also, data need not be compressed in units of clusters, but may be compressed on a file basis, or may be compressed on the basis of a unit smaller than a cluster such as a block or other. Additionally, the presence of a "hole" in the mapping table may be indicated by any notation that indicates that a full physical block is not being allocated. A valid physical block may be represented by any number that indicates in some fashion a portion of memory on storage media. Furthermore, in the embodiment described, the file system is structured such that the cluster size is the same for each file. However, it should be appreciated that the invention may also be used in conjunction with file systems that permit different files to utilize different cluster sizes. Therefore, the described embodiments should be taken as illustrative and not restrictive, and the invention should not be limited to the details given herein but should be defined by the following claims and their full scope of equivalents.

We claim:

1. A computer-implemented method of storing data in a file system having a mapping table arranged to map logical memory blocks to physical memory blocks, the method comprising the steps of:

requesting that a segment of data be written to physical memory, the segment of data being associated with selected logical memory blocks;

compressing the segment of data into compressed data such that the compressed data occupies fewer blocks of memory than the segment of data;

writing the compressed data to physical memory, the compressed data being written to at least one physical memory block; and updating the mapping table such that each physical memory block associated with the compressed data is mapped to by a mapping table entry corresponding to one of the selected logical memory blocks and each of the selected logical memory blocks that is not associated with any of the physical memory blocks is mapped to a hole identifier that does not correspond to any physical memory block.

2. A method as recited in claim 1 wherein the hole identifier identifies the compression algorithm used to compress the segment of data.

3. A method as recited in claim 1 wherein:

the segment of data may include a multiplicity of clusters, and the file system is arranged to process clusters, each cluster corresponding to a plurality of blocks of logical memory; and the compressing and writing steps are executed in a cluster by cluster manner.

4. A method as recited in claim 3 wherein:

a plurality of hole identifiers are available for use; and the hole identifier selected for use in association with a particular cluster identifies the compression algorithm used to compress data in that cluster.

5. A method as recited in claim 4 wherein different compression algorithms are used to compress different clusters within the segment of data.

6. A computer-implemented method of storing data in a file system having a mapping table arranged to map logical memory blocks to physical memory blocks, the file system being arranged to process clusters, each cluster corresponding to a plurality of logical memory blocks, the method comprising the steps of:

requesting that a segment of data be written to physical memory, the segment of data being associated with selected logical memory blocks, wherein the selected logical memory blocks may span a plurality of clusters; and determining whether the segment of data begins at an intermediate location within a first one of the clusters, wherein when it is determined that the segment of data begins at an intermediate location, the method further comprises the step of performing a partial cluster write operation utilizing the first cluster as a current cluster, the partial cluster write operation including the substeps of, a) reading data associated with the current cluster from physical memory into a read buffer, such current cluster data being stored in the read buffer in an expanded format, b) copying a portion of the segment of data associated with the current cluster into the read buffer after the reading step has been completed, c) compressing the data stored in the read buffer after the copying step, d) writing the compressed data to physical memory, and e) updating the mapping table such that each physical memory block associated with the compressed data is mapped to by a mapping table entry corresponding to one of the selected logical memory blocks that is associated with the current cluster and each of the selected logical memory blocks associated with the current cluster that is not associated with any of the physical memory blocks is mapped to a hole identifier that does not correspond to any physical memory block.

7. A method as recited in claim 6 further comprising the step of determining whether the current cluster is stored in a compressed format, and expanding the current cluster data for storage in the read buffer when it is determined that the current cluster is stored in a compressed format.

8. A method as recited in claim 6 wherein the hole identifier identifies the compression algorithm used to compress the data associated with the current cluster.

9. A method as recited in claim 8 wherein:
a plurality of hole identifiers are available for use; and
the hole identifier selected for use in association with a particular cluster identifies the compression algorithm used to compress data in that cluster.

10. A method as recited in claim 9 wherein different compression algorithms are used to compress different clusters within the segment of data.

11. A method as recited in claim 6 further comprising the steps of:
determining whether the segment of data ends at an intermediate location within a second one of the clusters, wherein when it is determined that the segment of data ends at an intermediate location, the method further comprises the step of performing the partial cluster write operation utilizing the second cluster as a current cluster.

12. A method as recited in claim 11 further comprising the steps of:
determining whether a selected cluster is a full cluster, a full cluster being one at which the segment of data being written neither begins nor ends in an intermediate location within the cluster, wherein when it is determined that a selected cluster is a full cluster, the method further comprises the steps of,
f) compressing the data associated with the full cluster,
g) writing the compressed data to physical memory,
h) updating the mapping table such that each physical memory block associated with the compressed data is mapped to an associated logical memory block that is associated with the full cluster and each logical memory block associated with the full cluster that is not associated with any of the physical memory blocks is mapped to a hole identifier that does not correspond to any physical memory block associated with the compressed data.

13. A computer-implemented method of retrieving data in a file system having a mapping table arranged to map logical memory blocks to physical memory blocks, the method comprising the steps of:
requesting that a segment of data be read from physical memory, the segment of data being associated with selected logical memory blocks; and
determining by reference to the mapping table whether any of the selected logical memory blocks are mapped to a hole identifier that indicates that the segment of data is stored in compressed form in the physical memory, wherein when it is determined that the segment of data is stored in compressed form, performing the sub-steps of,
a) reading from physical memory into a compression buffer all physical memory blocks that are associated with the selected logical memory blocks of the segment of data, and
b) expanding the physical memory blocks stored in the compression buffer so that the segment of data is then stored in expanded form in the compression buffer.

14. A method as recited in claim 13 wherein the hole identifier identifies the compression algorithm used to compress the segment of data.

15. A method as recited in claim 13 wherein:
the segment of data may include a multiplicity of clusters, and the file system is arranged to process clusters, each cluster corresponding to a plurality of blocks of logical memory; and
the reading and expanding steps are executed in a cluster by cluster manner.

16. A method as recited in claim 15 wherein:
a plurality of hole identifiers are available for use, and logical memory blocks in the mapping table corresponding to a particular cluster are mapped to at least one hole identifier that indicates the compression algorithm used to compress data in that particular cluster.

17. A method as recited in claim 16 wherein different compression algorithms are used to compress different clusters within the segment of data.

18. A method as recited in claim 13 wherein when it is determined that the segment of data is not stored in compressed form, reading from physical memory and into a read buffer all physical memory blocks that are associated with the selected logical memory blocks of the segment of data so that the segment of data is then stored in expanded form in the read buffer.

19. A computer apparatus for use in compressing and expanding a data segment in a file system, the data segment being associated with selected logical memory blocks, the computer apparatus comprising:
a central processing unit;
random access memory in communication with the central processing unit;
a mass storage device in communication with the central processing unit;
a mapping table arranged to map the selected logical memory blocks of the data segment to associated physical memory blocks of the mass storage device, such that when the data segment is stored in a compressed form on the mass storage device the compressed data segment occupies fewer physical memory blocks than the expanded data segment, and such that each physical memory block associated with the compressed data is mapped to by a mapping table entry corresponding to one of the selected logical memory blocks and each of the selected logical memory blocks that is not associated with any of the physical memory blocks is mapped to a hole identifier that does not correspond to any physical memory block.

20. An apparatus as recited in claim 19 wherein the hole identifier identifies the compression algorithm used to compress the segment of data.

21. An apparatus as recited in claim 19 wherein:
the segment of data may include a multiplicity of clusters, each cluster corresponding to a plurality of blocks of logical memory;
a plurality of hole identifiers are available for use; and
the hole identifier selected for use in association with a particular cluster identifies the compression algorithm used to compress data in that cluster.

22. An apparatus as recited in claim 21 wherein different compression algorithms are used to compress different clusters within the segment of data.

23. A computer program product comprising a computer-usable medium having computer-readable code embodied thereon for compressing and expanding data in a file system of a computer, the file system having a mapping table arranged to map logical memory blocks to physical memory blocks, the computer program product comprising the following computer-readable program code for effecting actions in the computer:

program code for requesting that a segment of data be written to physical memory, the segment of data being associated with selected logical memory blocks;

program code for compressing the segment of data into compressed data such that the compressed data occupies fewer blocks of memory than the segment of data;

program code for writing the compressed data to physical memory, the compressed data being written to at least one physical memory block; and program code for updating the mapping table such that each physical memory block associated with the compressed data is mapped to by a mapping table entry corresponding to one of the selected logical memory blocks and each of the selected logical memory blocks that is not associated with any of the physical memory blocks is mapped to a hole identifier that does not correspond to any physical memory block.

24. A computer program product as recited in claim 23 wherein the hole identifier identifies the compression algorithm used to compress the segment of data.

25. A computer program product as recited in claim 23 wherein:

the segment of data may include a multiplicity of clusters, and the file system is arranged to process clusters, each cluster corresponding to a plurality of blocks of logical memory; and compressing and writing the segment of data is executed in a cluster by cluster manner.

26. A computer program product as recited in claim 25 wherein:

a plurality of hole identifiers are available for use; and the hole identifier selected for use in association with a particular cluster identifies the compression algorithm used to compress data in that cluster.

27. A computer program product as recited in claim 26 wherein different compression algorithms are used to compress different clusters within the segment of data.

28. A computer-implemented method of transmitting the computer-readable program code as recited in claim 23, the method comprising the steps of:

storing the program code onto a computer-usable medium;

receiving a request for the transmission of the program code; and transmitting the program code over a network to a remote location.

\* \* \* \* \*